US012707493B2

(12) United States Patent
He et al.

(10) Patent No.: US 12,707,493 B2
(45) Date of Patent: Aug. 11, 2026

(54) COVERAGE ENHANCEMENT FOR CONTENTION FREE RANDOM ACCESS

(71) Applicant: QUALCOMM Incorporated, San Diego, CA (US)

(72) Inventors: Linhai He, San Diego, CA (US); Mahmoud Taherzadeh Boroujeni, San Diego, CA (US); Hung Dinh Ly, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 469 days.

(21) Appl. No.: 18/168,480

(22) Filed: Feb. 13, 2023

(65) Prior Publication Data

US 2023/0262754 A1 Aug. 17, 2023

Related U.S. Application Data

(60) Provisional application No. 63/309,995, filed on Feb. 14, 2022.

(51) Int. Cl.
*H04W 74/04* (2009.01)
*H04W 74/0838* (2024.01)
*H04W 74/0833* (2024.01)

(52) U.S. Cl.
CPC ....... *H04W 74/04* (2013.01); *H04W 74/0838* (2024.01); *H04W 74/0833* (2013.01)

(58) Field of Classification Search
CPC ....... H04L 1/0026; H04L 1/08; H04L 1/1825; H04L 1/1864; H04L 1/1893; H04L 1/1896; H04L 5/001; H04L 5/0026; H04L 5/0048; H04L 5/008; H04L 5/0091; H04L 5/14; H04W 74/0833; H04W 74/0838; H04W 74/04
See application file for complete search history.

(56) References Cited

U.S. PATENT DOCUMENTS

2016/0242212 A1* 8/2016 Wong ........................ H04W 4/70
2019/0053314 A1* 2/2019 Zhou ........................ H04W 76/18
2021/0051707 A1* 2/2021 Rastegardoost .......... H04L 5/10
(Continued)

FOREIGN PATENT DOCUMENTS

WO WO-2022020318 A1 1/2022

OTHER PUBLICATIONS

International Search Report and Written Opinion—PCT/US2023/062533—ISA/EPO—May 11, 2023 (2202274WO).
(Continued)

*Primary Examiner* — Mansour Oveissi
(74) *Attorney, Agent, or Firm* — Holland & Hart LLP

(57) ABSTRACT

Methods, systems, nodes, and devices for wireless communication are described. The method may include a first network node (e.g., a user equipment (UE)) receiving a first message that indicates a first preamble and transmitting a random access request message indicative of a request by the first network node for repetition based transmission of a second message. In response to the random access request, the first network node may receive a random access response message including an indication that the second message is to be transmitted with repetition and transmit the second message in accordance with repetition.

23 Claims, 19 Drawing Sheets

(56) References Cited

U.S. PATENT DOCUMENTS

2022/0046623 A1 2/2022 Xiong et al.

OTHER PUBLICATIONS

Qualcomm Incorporated: "RAN2 Enhancements for Msg3 Repetition", 3GPP TSG-RAN WG2 Meeting #115-e, R2-2107220, 3rd Generation Partnership Project, Mobile Competence Centre, 650, Route Des Lucioles, F-06921 Sophia-Antipolis Cedex, France, vol. RAN WG2, No. Online, Aug. 16-Aug. 27, 2021, Aug. 6, 2021, pp. 1-3, XP052033966, paragraph 1.

* cited by examiner

COVERAGE ENHANCEMENT FOR CONTENTION FREE RANDOM ACCESS

CROSS REFERENCE

The present application for patent claims the benefit of U.S. Provisional Patent Application No. 63/309,995 by HE et al., entitled "COVERAGE ENHANCEMENT FOR CONTENTION FREE RANDOM ACCESS," filed Feb. 14, 2022, and assigned to the assignee hereof. U.S. Provisional Patent Application No. 63/309,995 is expressly incorporated by reference herein in its entirety.

INTRODUCTION

The following relates to wireless communication relating to coverage enhancement for contention-free random access (CFRA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

The described techniques relate to improved methods, systems, nodes, devices, and apparatuses that support coverage enhancement for contention-free random access (CFRA). For example, the described techniques provide for CFRA with coverage enhancement. That is, during a CFRA procedure, a base station may schedule the user equipment (UE) to transmit an uplink message (for example, a Msg3 of a random access channel (RACH) procedure) with repetition. In one aspect, the decision to perform CFRA with coverage enhancement may be made at the UE. For example, the UE may determine to perform CFRA with coverage enhancement based on measurements made of one or more received reference signals. The UE may indicate the decision to perform CFRA with coverage enhancement by including a preamble in a random access message (Msg1), where the preamble is associated with CFRA with coverage enhancement. Alternatively, the UE may indicate the decision to perform CFRA with coverage enhancement by transmitting Msg1 over a set of random access occasions configured for CFRA with coverage enhancement. The base station may then schedule the UE to transmit an uplink message (for example, Msg3) with the repetition.

In another aspect, the network (instead of the UE) may determine that the UE is to perform CFRA with coverage enhancement based on a measurement report obtained by the network during a handover procedure involving the UE. The base station may then indicate that the UE is to transmit the random access message at the repetition. The indication that the UE is to use repetition in Msg3 may be transmitted to the UE via a configuration message or a random access response message (Msg2). The methods described herein may allow a UE to repeatedly transmit an uplink message as part of a CFRA procedure which may increase the probability of receiving the uplink message at the base station, thereby enhancing coverage.

A method for wireless communication at a first network node is described. The method may include receiving a first message that indicates a first preamble allocated to the first network node for a random access procedure, transmitting, as part of the random access procedure, a random access request message including the first preamble, where transmission of the random access request message is indicative of a request by the first network node for repetition based transmission of a second message, receiving, as part of the random access procedure and responsive to the random access request message, a random access response message including a resource grant for the second message and an indication that the second message is to be transmitted with repetition, and transmitting, as part of the random access procedure, the second message in accordance with the resource grant and with repetition.

An apparatus for wireless communication at a first network node is described. The apparatus may include a memory and at least one processor coupled to the memory. The at least one processor may be configured to receive a first message that indicates a first preamble allocated to the first network node for a random access procedure, transmit, as part of the random access procedure, a random access request message including the first preamble, where transmission of the random access request message is indicative of a request by the first network node for repetition based transmission of a second message, receive, as part of the random access procedure and responsive to the random access request message, a random access response message including a resource grant for the second message and an indication that the second message is to be transmitted with repetition, and transmit, as part of the random access procedure, the second message in accordance with the resource grant and with repetition.

Another apparatus for wireless communication at a first network node is described. The apparatus may include means for receiving a first message that indicates a first preamble allocated to the first network node for a random access procedure, means for transmitting, as part of the random access procedure, a random access request message including the first preamble, where transmission of the random access request message is indicative of a request by the first network node for repetition based transmission of a second message, means for receiving, as part of the random access procedure and responsive to the random access request message, a random access response message including a resource grant for the second message and an indication that the second message is to be transmitted with repetition, and means for transmitting, as part of the random access procedure, the second message in accordance with the resource grant and with repetition.

A non-transitory computer-readable medium having code for wireless communication is described. The code stored thereon that, when executed by the first network node, may cause the first network node to receive a first message that indicates a first preamble allocated to the first network node for a random access procedure, transmit, as part of the random access procedure, a random access request message including the first preamble, where transmission of the random access request message is indicative of a request by the first network node for repetition based transmission of a second message, receive, as part of the random access procedure and responsive to the random access request message, a random access response message including a resource grant for the second message and an indication that the second message is to be transmitted with repetition, and transmit, as part of the random access procedure, the second message in accordance with the resource grant and with repetition.

Some aspects of the method, apparatuses, and non-transitory computer-readable medium described herein may further include operations, features, means, or instructions for receiving one or more reference signals and measuring the one or more reference signals resulting in one or more measurements, where transmitting the random access request message may be based on the one or more measurements of the one or more reference signals.

In some aspects of the method, apparatuses, and non-transitory computer-readable medium described herein, the random access procedure may be a CFRA procedure.

Some aspects of the method, apparatuses, and non-transitory computer-readable medium described herein may further include operations, features, means, or instructions for comparing the one or more measurements to a first threshold, where transmitting the random access request message may be based on the comparison.

In some aspects of the method, apparatuses, and non-transitory computer-readable medium described herein, the comparison may be indicative that the one or more measurements may be greater than the first threshold.

Some aspects of the method, apparatuses, and non-transitory computer-readable medium described herein may further include operations, features, means, or instructions for comparing the one or more measurements to a second threshold, where the second threshold may be greater than the first threshold, and where transmitting the random access request message may be based on the one or more measurements of the one or more reference signals being between the first threshold and the second threshold.

In some aspects of the method, apparatuses, and non-transitory computer-readable medium described herein, the first threshold may be greater than a third threshold.

In some aspects of the method, apparatuses, and non-transitory computer-readable medium described herein, the first threshold corresponds to a first type of the random access procedure, the first type of the random access procedure includes a CFRA procedure with a coverage enhancement, the second threshold corresponds to a second type of the random access procedure, the second type of the random access procedure includes a CFRA procedure without the coverage enhancement, and the third threshold corresponds a third type of the random access procedure, and the third type of the random access procedure includes a CBRA procedure.

Some aspects of the method, apparatuses, and non-transitory computer-readable medium described herein may further include operations, features, means, or instructions for receiving at least one of an indication of the first threshold, an indication of the second threshold, or an indication of the third threshold.

In some aspects of the method, apparatuses, and non-transitory computer-readable medium described herein, the one or more measurements include at least a reference signal received power (RSRP) value.

Some aspects of the method, apparatuses, and non-transitory computer-readable medium described herein may further include operations, features, means, or instructions for comparing the one or more measurements to a set of multiple thresholds resulting in a first determination or a second determination, where including the first preamble in the random access request message may be based on the first determination, and where including a second preamble in the random access request message may be based on the second determination.

Some aspects of the method, apparatuses, and non-transitory computer-readable medium described herein may further include operations, features, means, or instructions for comparing the one or more measurements to a set of multiple thresholds resulting in a first determination or a second determination, where transmitting the random access request message using a first random access occasion may be based on the first determination, and where transmitting the random access request message using a second random access occasion may be based on the second determination.

Some aspects of the method, apparatuses, and non-transitory computer-readable medium described herein may further include operations, features, means, or instructions for determining that the one or more measurements of the one or more reference signals may be within a first range of values associated with CFRA transmissions with a coverage enhancement.

In some aspects of the method, apparatuses, and non-transitory computer-readable medium described herein, a second range of values greater than the first range of values may be associated with CFRA transmissions without the coverage enhancement.

In some aspects of the method, apparatuses, and non-transitory computer-readable medium described herein, a second range of values less than the first range of values may be associated with CBRA transmissions with the coverage enhancement, and a third range of values greater than the second range of values and less than the first range of values may be associated with CBRA transmissions without the coverage enhancement.

In some aspects of the method, apparatuses, and non-transitory computer-readable medium described herein, the first message includes an indication of a second preamble different from the first preamble, the first preamble may be associated with repetition based transmission of the second message, and the second preamble may be associated with transmission of the second message without repetition.

In some aspects of the method, apparatuses, and non-transitory computer-readable medium described herein, the transmission of the random access request message may be indicative of the request by the first network node for repetition based transmission of the second message based on the random access request message including the first preamble.

Some aspects of the method, apparatuses, and non-transitory computer-readable medium described herein may further include operations, features, means, or instructions for including the first preamble in the random access request message to indicate the request for resources for repetition based transmission of the second message.

Some aspects of the method, apparatuses, and non-transitory computer-readable medium described herein may further include operations, features, means, or instructions for receiving an indication of a first set of random access occasions and a second set of random access occasions for transmission of the random access request message, where the first set of random access occasions may be associated with repetition based transmission of the second message, and where the second set of random access occasions may be associated with transmission of the second message without repetition.

In some aspects of the method, apparatuses, and non-transitory computer-readable medium described herein, transmitting the random access request message may include operations, features, means, or instructions for transmitting the random access request message over resources associated with the first set of random access occasions to indicate the request for the resources for repetition based transmission of the second message.

In some aspects of the method, apparatuses, and non-transitory computer-readable medium described herein, the first message includes a downlink message and the second message includes an uplink message.

A method for wireless communication at a first network node is described. The method may include transmitting a first message that indicates a first preamble that is allocated to a second network node for a random access procedure, receiving, as part of the random access procedure, a random access request message including the first preamble, where reception of the random access request message is indicative of a request by the second network node for repetition based transmission of a second message, transmitting, as part on the random access procedure and responsive to the random access request message, a random access response message including a resource grant for the second message and an indication that the second message is to be transmitted with repetition, and receiving, as part of the random access procedure, the second message in accordance with the resource grant and with repetition.

An apparatus for wireless communication at a first network node is described. The apparatus may include a memory and at least one processor coupled to the memory. The at least one processor may be configured to transmit a first message that indicates a first preamble that is allocated to a second network node for a random access procedure, receive, as part of the random access procedure, a random access request message including the first preamble, where reception of the random access request message is indicative of a request by the second network node for repetition based transmission of a second message, transmit, as part on the random access procedure and responsive to the random access request message, a random access response message including a resource grant for the second message and an indication that the second message is to be transmitted with repetition, and receive, as part of the random access procedure, the second message in accordance with the resource grant and with repetition.

Another apparatus for wireless communication at a first network node is described. The apparatus may include means for transmitting a first message that indicates a first preamble that is allocated to a second network node for a random access procedure, means for receiving, as part of the random access procedure, a random access request message including the first preamble, where reception of the random access request message is indicative of a request by the second network node for repetition based transmission of a second message, means for transmitting, as part on the random access procedure and responsive to the random access request message, a random access response message including a resource grant for the second message and an indication that the second message is to be transmitted with repetition, and means for receiving, as part of the random access procedure, the second message in accordance with the resource grant and with repetition.

A non-transitory computer-readable medium having code for wireless communication is described. The code stored thereon that, when executed by the first network node, may cause the first network node to transmit a first message that indicates a first preamble that is allocated to a second network node for a random access procedure, receive, as part of the random access procedure, a random access request message including the first preamble, where reception of the random access request message is indicative of a request by the second network node for repetition based transmission of a second message, transmit, as part on the random access procedure and responsive to the random access request message, a random access response message including a resource grant for the second message and an indication that the second message is to be transmitted with repetition, and receive, as part of the random access procedure, the second message in accordance with the resource grant and with repetition.

In some aspects of the method, apparatuses, and non-transitory computer-readable medium described herein, the random access procedure may be a CFRA procedure.

Some aspects of the method, apparatuses, and non-transitory computer-readable medium described herein may further include operations, features, means, or instructions for transmitting at least one of an indication of a first threshold, an indication of a second threshold, or an indication of a third threshold, where the first threshold may be less than the second threshold and the second threshold may be less than the third threshold, and where the random access request message being indicative of the request by the second network node for repetition based transmission of the second message may be based on at least one of the first threshold, the second threshold, or the third threshold.

In some aspects of the method, apparatuses, and non-transitory computer-readable medium described herein, the first threshold corresponds to a first type of the random access procedure, the first type of the random access procedure includes a CFRA procedure with a coverage enhancement, the second threshold corresponds to a second type of the random access procedure, the second type of the random access procedure includes a CFRA procedure without the coverage enhancement, and the third threshold corresponds a third type of the random access procedure, and the third type of the random access procedure includes a CBRA procedure.

In some aspects of the method, apparatuses, and non-transitory computer-readable medium described herein, the first message includes an indication of a second preamble different from the first preamble, the first preamble may be associated with repetition based transmission of the second message, and the second preamble may be associated with transmission of the second message without repetition.

In some aspects of the method, apparatuses, and non-transitory computer-readable medium described herein, the reception of the random access request message may be indicative of the request by the second network node for repetition based transmission of the second message based on the random access request message including the first preamble.

Some aspects of the method, apparatuses, and non-transitory computer-readable medium described herein may further include operations, features, means, or instructions for transmitting an indication of a first set of random access occasions and a second set of random access occasions for transmission of the random access request message, where the first set of random access occasions may be associated with repetition based transmission of the second message, and where the second set of random access occasions may be associated with transmission of the second message without repetition.

In some aspects of the method, apparatuses, and non-transitory computer-readable medium described herein, receiving the random access request message may include operations, features, means, or instructions for receiving the random access request message during the first set of random access occasions and determining that the random access request message may be indicative of the request by the second network node for repetition based transmission of the second message based on the random access request message being received during the first set of random access occasions.

In some aspects of the method, apparatuses, and non-transitory computer-readable medium described herein, the first message includes a downlink message and the second message includes an uplink message.

A method for wireless communication at a first network node is described. The method may include receiving a measurement report indicating a quality of a link between the first network node and a second network node, transmitting a first message that indicates a preamble allocated to the second network node for a random access request message that is part of a random access procedure, where the preamble is allocated to the second network node based on the measurement report, transmitting an indication for the second network node to transmit a second message with repetition, where the second message is transmitted as part of the random access procedure but after the random access request message, and where the indication for the second network node to transmit the second message with repetition is based on the measurement report, and receive the second message as part of the random access procedure.

An apparatus for wireless communication at a first network node is described. The apparatus may include a memory and at least one processor coupled to the memory. The at least one processor may be configured to receive a measurement report indicating a quality of a link between the first network node and a second network node, transmit a first message that indicates a preamble allocated to the second network node for a random access request message that is part of a random access procedure, where the preamble is allocated to the second network node based on the measurement report, transmit an indication for the second network node to transmit a second message with repetition, where the second message is transmitted as part of the random access procedure but after the random access request message, and where the indication for the second network node to transmit the second message with repetition is based on the measurement report, and receive the second message as part of the random access procedure.

Another apparatus for wireless communication at a first network node is described. The apparatus may include means for receiving a measurement report indicating a quality of a link between the first network node and a second network node, means for transmitting a first message that indicates a preamble allocated to the second network node for a random access request message that is part of a random access procedure, where the preamble is allocated to the second network node based on the measurement report, means for transmitting an indication for the second network node to transmit a second message with repetition, where the second message is transmitted as part of the random access procedure but after the random access request message, and where the indication for the second network node to transmit the second message with repetition is based on the measurement report, and means for receive the second message as part of the random access procedure.

A non-transitory computer-readable medium having code for wireless communication is described. The code stored thereon that, when executed by the first network node, may cause the first network node to receive a measurement report indicating a quality of a link between the first network node and a second network node, transmit a first message that indicates a preamble allocated to the second network node for a random access request message that is part of a random access procedure, where the preamble is allocated to the second network node based on the measurement report, transmit an indication for the second network node to transmit a second message with repetition, where the second message is transmitted as part of the random access procedure but after the random access request message, and where the indication for the second network node to transmit the second message with repetition is based on the measurement report, and receive the second message as part of the random access procedure.

In some aspects of the method, apparatuses, and non-transitory computer-readable medium described herein, transmitting the indication for the second network node to transmit the second message with the repetition may include operations, features, means, or instructions for transmitting, as part of the random access procedure and to the second network node, a random access response message including a resource grant for the second message and the indication for the second network node to transmit the second message with repetition.

In some aspects of the method, apparatuses, and non-transitory computer-readable medium described herein, the random access response message includes information indicative of the indication for the second network node to transmit the second message with repetition in a bit field for a cell radio network temporary identifier (C-RNTI).

In some aspects of the method, apparatuses, and non-transitory computer-readable medium described herein, transmitting the indication for the second network node to transmit the second message with the repetition may include operations, features, means, or instructions for transmitting, to the second network node, a radio resource control (RRC) message indicating a configuration for the random access procedure, the configuration including the indication for the second network node to transmit the second message with repetition.

In some aspects of the method, apparatuses, and non-transitory computer-readable medium described herein, receiving the measurement report may include operations, features, means, or instructions for receiving the measurement report from a third network node different from the second network node.

Some aspects of the method, apparatuses, and non-transitory computer-readable medium described herein may further include operations, features, means, or instructions for receiving, as part of the random access procedure and from the second network node, a random access request message including the preamble, where the preamble may be indicative that the random access procedure may be a CFRA procedure instead of a CBRA procedure.

In some aspects of the method, apparatuses, and non-transitory computer-readable medium described herein, the first message includes a downlink message and the second message includes an uplink message.

A method for wireless communication at a first network node is described. The method may include transmitting a measurement report indicating a quality of link between the first network node and a second network node, receiving a first message that indicates a preamble allocated to the first network node for a random access request message that is part of a random access procedure, where the preamble is allocated to the first network node based on the measurement report, receiving an indication for the first network node to transmit a second message with repetition, where the second message is received as part of the random access procedure but after the random access request message, and where the indication for the first network node to transmit the second message with repetition based on the measurement report, and transmitting the second message as part of the random access procedure.

An apparatus for wireless communication at a first network node is described. The apparatus may include a memory and at least one processor coupled to the memory. The at least one processor may be configured to transmit a measurement report indicating a quality of link between the first network node and a second network node, receive a first message that indicates a preamble allocated to the first network node for a random access request message that is part of a random access procedure, where the preamble is allocated to the first network node based on the measurement report, receive an indication for the first network node to transmit a second message with repetition, where the second message is received as part of the random access procedure but after the random access request message, and where the indication for the first network node to transmit the second message with repetition based on the measurement report, and transmit the second message as part of the random access procedure.

Another apparatus for wireless communication at a first network node is described. The apparatus may include means for transmitting a measurement report indicating a quality of link between the first network node and a second network node, means for receiving a first message that indicates a preamble allocated to the first network node for a random access request message that is part of a random access procedure, where the preamble is allocated to the first network node based on the measurement report, means for receiving an indication for the first network node to transmit a second message with repetition, where the second message is received as part of the random access procedure but after the random access request message, and where the indication for the first network node to transmit the second message with repetition based on the measurement report, and means for transmitting the second message as part of the random access procedure.

A non-transitory computer-readable medium having code for wireless communication is described. The code stored thereon that, when executed by the first network node, may cause the first network node to transmit a measurement report indicating a quality of link between the first network node and a second network node, receive a first message that indicates a preamble allocated to the first network node for a random access request message that is part of a random access procedure, where the preamble is allocated to the first network node based on the measurement report, receive an indication for the first network node to transmit a second message with repetition, where the second message is received as part of the random access procedure but after the random access request message, and where the indication for the first network node to transmit the second message with repetition based on the measurement report, and transmit the second message as part of the random access procedure.

In some aspects of the method, apparatuses, and non-transitory computer-readable medium described herein, receiving the indication for the first network node to transmit the second message with repetition may include operations, features, means, or instructions for receiving, as part of the random access procedure and from the second network node, a random access response message including a resource grant for the second message and the indication for the first network node to transmit the second message with repetition.

In some aspects of the method, apparatuses, and non-transitory computer-readable medium described herein, the random access response message includes information indicative of the indication for the first network node to transmit the second message with repetition in a bit field for a C-RNTI.

In some aspects of the method, apparatuses, and non-transitory computer-readable medium described herein, receiving the indication for the first network node to transmit the second message with repetition may include operations, features, means, or instructions for receiving, from the second network node, an RRC message indicating a configuration for the random access procedure, the configuration including the indication for the first network node to transmit the second message with repetition.

In some aspects of the method, apparatuses, and non-transitory computer-readable medium described herein, transmitting the measurement report may include operations, features, means, or instructions for transmitting the measurement report to a third network node different from the second network node.

Some aspects of the method, apparatuses, and non-transitory computer-readable medium described herein may further include operations, features, means, or instructions for transmitting, as part of the random access procedure and to the second network node, a random access request message including the preamble, where the preamble may be indicative that the random access procedure may be a CFRA procedure instead of a CBRA procedure.

In some aspects of the method, apparatuses, and non-transitory computer-readable medium described herein, the first message includes a downlink message and the second message includes an uplink message.

A method for wireless communication at a first network node is described. The method may include receiving a first message that indicates a first preamble allocated to a first network node for a random access procedure, transmitting, as part of the random access procedure, a random access request message including the first preamble, receiving, as part of the random access procedure and responsive to the random access request message, a random access response message including a resource grant for a second message, where the random access response message is decoded based on satisfaction of one or more conditions associated with repetition based transmission of the second message, and transmitting, as part of the random access procedure, the second message with repetition in accordance with the resource grant.

An apparatus for wireless communication at a first network node is described. The apparatus may include a memory and at least one processor coupled to the memory. The at least one processor may be configured to receive a first message that indicates a first preamble allocated to a first network node for a random access procedure, transmit, as part of the random access procedure, a random access request message including the first preamble, receive, as part of the random access procedure and responsive to the random access request message, a random access response message including a resource grant for a second message, where the random access response message is decoded based on satisfaction of one or more conditions associated with repetition based transmission of the second message, and transmit, as part of the random access procedure, the second message with repetition in accordance with the resource grant.

Another apparatus for wireless communication at a first network node is described. The apparatus may include means for receiving a first message that indicates a first preamble allocated to a first network node for a random access procedure, means for transmitting, as part of the random access procedure, a random access request message including the first preamble, means for receiving, as part of the random access procedure and responsive to the random access request message, a random access response message including a resource grant for a second message, where the random access response message is decoded based on satisfaction of one or more conditions associated with repetition based transmission of the second message, and means for transmitting, as part of the random access procedure, the second message with repetition in accordance with the resource grant.

A non-transitory computer-readable medium having code for wireless communication is described. The code stored thereon that, when executed by the first network node, may cause the first network node to receive a first message that indicates a first preamble allocated to a first network node for a random access procedure, transmit, as part of the random access procedure, a random access request message including the first preamble, receive, as part of the random access procedure and responsive to the random access request message, a random access response message including a resource grant for a second message, where the random access response message is decoded based on satisfaction of one or more conditions associated with repetition based transmission of the second message, and transmit, as part of the random access procedure, the second message with repetition in accordance with the resource grant.

In some aspects of the method, apparatuses, and non-transitory computer-readable medium described herein, transmission of the random access request message may be indicative of a request by the first network node to perform the repetition based transmission of the second message.

Some aspects of the method, apparatuses, and non-transitory computer-readable medium described herein may further include operations, features, means, or instructions for receiving one or more reference signals and measuring the one or more reference signals resulting in one or more measurements, where transmitting the random access request message may be based on the one or more measurements of the one or more reference signals.

In some aspects of the method, apparatuses, and non-transitory computer-readable medium described herein, the random access procedure may be a CFRA procedure.

Some aspects of the method, apparatuses, and non-transitory computer-readable medium described herein may further include operations, features, means, or instructions for comparing the one or more measurements to a first threshold, where transmitting the random access request message may be based on the comparison.

In some aspects of the method, apparatuses, and non-transitory computer-readable medium described herein, the comparison may be indicative that the one or more measurements may be greater than the first threshold.

Some aspects of the method, apparatuses, and non-transitory computer-readable medium described herein may further include operations, features, means, or instructions for comparing the one or more measurements to a second threshold, where the second threshold may be greater than the first threshold, and where the satisfaction of the one or more conditions includes the one or more measurements of the one or more reference signals being between the first threshold and the second threshold.

In some aspects of the method, apparatuses, and non-transitory computer-readable medium described herein, the first threshold may be greater than a third threshold.

In some aspects of the method, apparatuses, and non-transitory computer-readable medium described herein, the first threshold corresponds to a first type of the random access procedure, the first type of the random access procedure includes a CFRA procedure with a coverage enhancement, the second threshold corresponds to a second type of the random access procedure, the second type of the random access procedure includes a CFRA procedure without the coverage enhancement, and the third threshold corresponds a third type of the random access procedure, and the third type of the random access procedure includes a CBRA procedure.

Some aspects of the method, apparatuses, and non-transitory computer-readable medium described herein may further include operations, features, means, or instructions for receiving at least one of an indication of the first threshold, an indication of the second threshold, and an indication of the third threshold.

In some aspects of the method, apparatuses, and non-transitory computer-readable medium described herein, the one or more measurements include at least an RSRP value.

Some aspects of the method, apparatuses, and non-transitory computer-readable medium described herein may further include operations, features, means, or instructions for comparing the one or more measurements to a set of multiple thresholds resulting in a first determination or a second determination, where the method further including the first preamble in the random access request message based on the first determination, and including a second preamble in the random access request message based on the second determination.

Some aspects of the method, apparatuses, and non-transitory computer-readable medium described herein may further include operations, features, means, or instructions for comparing the one or more measurements to a set of multiple thresholds resulting in a first determination or a second determination, where the random access request message may be transmitted using a first random access occasion based on the first determination, and the random access request message may be transmitted using a second random access occasion based on the second determination.

Some aspects of the method, apparatuses, and non-transitory computer-readable medium described herein may further include operations, features, means, or instructions for determining that the one or more measurements of the one or more reference signals may be within a first range of values associated with CFRA transmissions with a coverage enhancement, where satisfaction of the one or more conditions includes the one or more measurements of the one or more reference signals being within the first range of values associated with the CFRA transmissions with the coverage enhancement.

In some aspects of the method, apparatuses, and non-transitory computer-readable medium described herein, a second range of values greater than the first range of values may be associated with CFRA transmissions without the coverage enhancement.

In some aspects of the method, apparatuses, and non-transitory computer-readable medium described herein, a second range of values less than the first range of values may be associated with CBRA transmissions with the coverage enhancement, and a third range of values greater than the second range of values and less than the first range of values may be associated with CBRA transmissions without the coverage enhancement.

In some aspects of the method, apparatuses, and non-transitory computer-readable medium described herein, the first message includes an indication of a second preamble different from the first preamble, the first preamble may be associated with repetition based transmission of the second message, and the second preamble may be associated with transmission of the second message without repetition.

In some aspects of the method, apparatuses, and non-transitory computer-readable medium described herein, the transmission of the random access request message may be indicative of the request by the first network node for repetition based transmission of the second message based on the random access request message including the first preamble.

Some aspects of the method, apparatuses, and non-transitory computer-readable medium described herein may further include operations, features, means, or instructions for including the first preamble in the random access request message to indicate the request for resources for repetition based transmission of the second message.

Some aspects of the method, apparatuses, and non-transitory computer-readable medium described herein may further include operations, features, means, or instructions for receiving an indication of a first set of random access occasions and a second set of random access occasions for transmission of the random access request message, where the first set of random access occasions may be associated with repetition based transmission of the second message, and where the second set of random access occasions may be associated with transmission of the second message without repetition.

In some aspects of the method, apparatuses, and non-transitory computer-readable medium described herein, transmitting the random access request message may include operations, features, means, or instructions for transmitting the random access request message over resources associated with the first set of random access occasions to indicate a request for the resources for repetition based transmission of the second message.

In some aspects of the method, apparatuses, and non-transitory computer-readable medium described herein, the first message includes a downlink message and the second message includes an uplink message.

Some aspects of the method, apparatuses, and non-transitory computer-readable medium described herein may further include operations, features, means, or instructions for transmitting a measurement report that may be indicative of a quality of a link between the first network node and a second network node, where the first preamble may be allocated based on the measurement report.

Some aspects of the method, apparatuses, and non-transitory computer-readable medium described herein may further include operations, features, means, or instructions for receiving an indication for the first network node to transmit the second message with repetition based on the measurement report, where satisfaction of the one or more conditions includes reception of the indication for the first network node to transmit the second message with repetition.

In some aspects of the method, apparatuses, and non-transitory computer-readable medium described herein, the random access response message further includes the indication for the first network node to transmit the second message with repetition.

In some aspects of the method, apparatuses, and non-transitory computer-readable medium described herein, the random access response message includes information indicative of the indication for the first network node to transmit the second message with repetition in a bit field for a C-RNTI.

In some aspects of the method, apparatuses, and non-transitory computer-readable medium described herein, receiving the indication for the first network node to transmit the second message with repetition may include operations, features, means, or instructions for receiving, from the second network node, an RRC message that may be indicative of a configuration for the random access procedure, the configuration including the indication for the first network node to transmit the second message with repetition.

In some aspects of the method, apparatuses, and non-transitory computer-readable medium described herein, transmitting the measurement report may include operations, features, means, or instructions for transmit the measurement report to a third network node different from the second network node.

In some aspects of the method, apparatuses, and non-transitory computer-readable medium described herein, the first preamble may be indicative that the random access procedure may be a CFRA procedure instead of a CBRA procedure.

A method for wireless communication at a first network node is described. The method may include transmitting a first message that indicates a first preamble that is allocated to a second network node for a random access procedure, receiving, as part of the random access procedure, a random access request message including the first preamble, transmitting, as part on the random access procedure and responsive to the random access request message, a random access response message including a resource grant for a second message, where an interpretation of the random access response message is based on satisfaction of one or more conditions associated with repetition based transmission of the second message, and receiving, as part of the random access procedure, the second message with repetition in accordance with the resource grant.

An apparatus for wireless communication at a first network node is described. The apparatus may include a memory and at least one processor coupled to the memory. The at least one processor may be configured to transmit a first message that indicates a first preamble that is allocated to a second network node for a random access procedure, receive, as part of the random access procedure, a random access request message including the first preamble, transmit, as part on the random access procedure and responsive to the random access request message, a random access response message including a resource grant for a second message, where an interpretation of the random access response message is based on satisfaction of one or more conditions associated with repetition based transmission of the second message, and receive, as part of the random access procedure, the second message with repetition in accordance with the resource grant.

Another apparatus for wireless communication at a first network node is described. The apparatus may include means for transmitting a first message that indicates a first preamble that is allocated to a second network node for a random access procedure, means for receiving, as part of the random access procedure, a random access request message including the first preamble, means for transmitting, as part on the random access procedure and responsive to the random access request message, a random access response message including a resource grant for a second message, where an interpretation of the random access response message is based on satisfaction of one or more conditions associated with repetition based transmission of the second message, and means for receiving, as part of the random access procedure, the second message with repetition in accordance with the resource grant.

A non-transitory computer-readable medium having code for wireless communication is described. The code stored thereon that, when executed by the first network node, may cause the first network node to transmit a first message that indicates a first preamble that is allocated to a second network node for a random access procedure, receive, as part of the random access procedure, a random access request message including the first preamble, transmit, as part on the random access procedure and responsive to the random access request message, a random access response message including a resource grant for a second message, where an interpretation of the random access response message is based on satisfaction of one or more conditions associated with repetition based transmission of the second message, and receive, as part of the random access procedure, the second message with repetition in accordance with the resource grant.

In some aspects of the method, apparatuses, and non-transitory computer-readable medium described herein, reception of the random access request message may be indicative of a request by the second network node to perform the repetition based transmission of the second message.

In some aspects of the method, apparatuses, and non-transitory computer-readable medium described herein, the random access procedure may be a CFRA procedure.

Some aspects of the method, apparatuses, and non-transitory computer-readable medium described herein may further include operations, features, means, or instructions for transmitting at least one of an indication of a first threshold, an indication of a second threshold, and an indication of a third threshold, where the first threshold may be less than the second threshold and the second threshold may be less than the third threshold, and where the random access request message being indicative of the request by the second network node for repetition based transmission of the second message may be based on at least one of the first threshold, the second threshold, or the third threshold.

In some aspects of the method, apparatuses, and non-transitory computer-readable medium described herein, the first threshold corresponds to a first type of the random access procedure, the first type of the random access procedure includes a CFRA procedure with a coverage enhancement, the second threshold corresponds to a second type of the random access procedure, the second type of the random access procedure includes a CFRA procedure without the coverage enhancement, and the third threshold corresponds a third type of the random access procedure, and the third type of the random access procedure includes a CBRA procedure.

In some aspects of the method, apparatuses, and non-transitory computer-readable medium described herein, the first message includes an indication of a second preamble different from the first preamble, the first preamble may be associated with repetition based transmission of the second message, and the second preamble may be associated with transmission of the second message without repetition.

In some aspects of the method, apparatuses, and non-transitory computer-readable medium described herein, reception of the random access request message may be indicative of a request by the second network node for repetition based transmission of the second message.

Some aspects of the method, apparatuses, and non-transitory computer-readable medium described herein may further include operations, features, means, or instructions for transmitting an indication of a first set of random access occasions and a second set of random access occasions for transmission of the random access request message, where the first set of random access occasions may be associated with repetition based transmission of the second message, and where the second set of random access occasions may be associated with transmission of the second message without repetition.

In some aspects of the method, apparatuses, and non-transitory computer-readable medium described herein, receiving the random access request message may include operations, features, means, or instructions for receiving the random access request message over resources associated with the first set of random access occasions and determining that the random access request message may be indicative of a request by the second network node for repetition based transmission of the second message based on the random access request message being received during the first set of random access occasions.

In some aspects of the method, apparatuses, and non-transitory computer-readable medium described herein, the first message includes a downlink message and the second message includes an uplink message.

Some aspects of the method, apparatuses, and non-transitory computer-readable medium described herein may further include operations, features, means, or instructions for receiving a measurement report that may be indicative of a quality of a link between a first network node and the second network node, where the first preamble may be allocated based on the measurement report.

Some aspects of the method, apparatuses, and non-transitory computer-readable medium described herein may further include operations, features, means, or instructions for transmitting an indication for the second network node to transmit the second message with repetition based on the measurement report, where satisfaction of the one or more conditions includes transmission of the indication for the second network node to transmit the second message with repetition.

In some aspects of the method, apparatuses, and non-transitory computer-readable medium described herein, the random access response message further includes the indication for the second network node to transmit the second message with repetition.

In some aspects of the method, apparatuses, and non-transitory computer-readable medium described herein, the random access response message includes information indicative of the indication for the second network node to transmit the second message with repetition in a bit field for a C-RNTI.

In some aspects of the method, apparatuses, and non-transitory computer-readable medium described herein, transmitting the indication for the second network node to transmit the second message may include operations, features, means, or instructions for transmitting, to the second network node, an RRC message that may be indicative of a configuration for the random access procedure, the configuration including the indication for the second network node to transmit the second message with repetition.

In some aspects of the method, apparatuses, and non-transitory computer-readable medium described herein, receiving the measurement report may include operations, features, means, or instructions for receiving the measurement report from a third network node different from the second network node.

In some aspects of the method, apparatuses, and non-transitory computer-readable medium described herein, the first preamble may be indicative that the random access procedure may be a CFRA procedure instead of a CBRA procedure.

DETAILED DESCRIPTION

Figure 1:
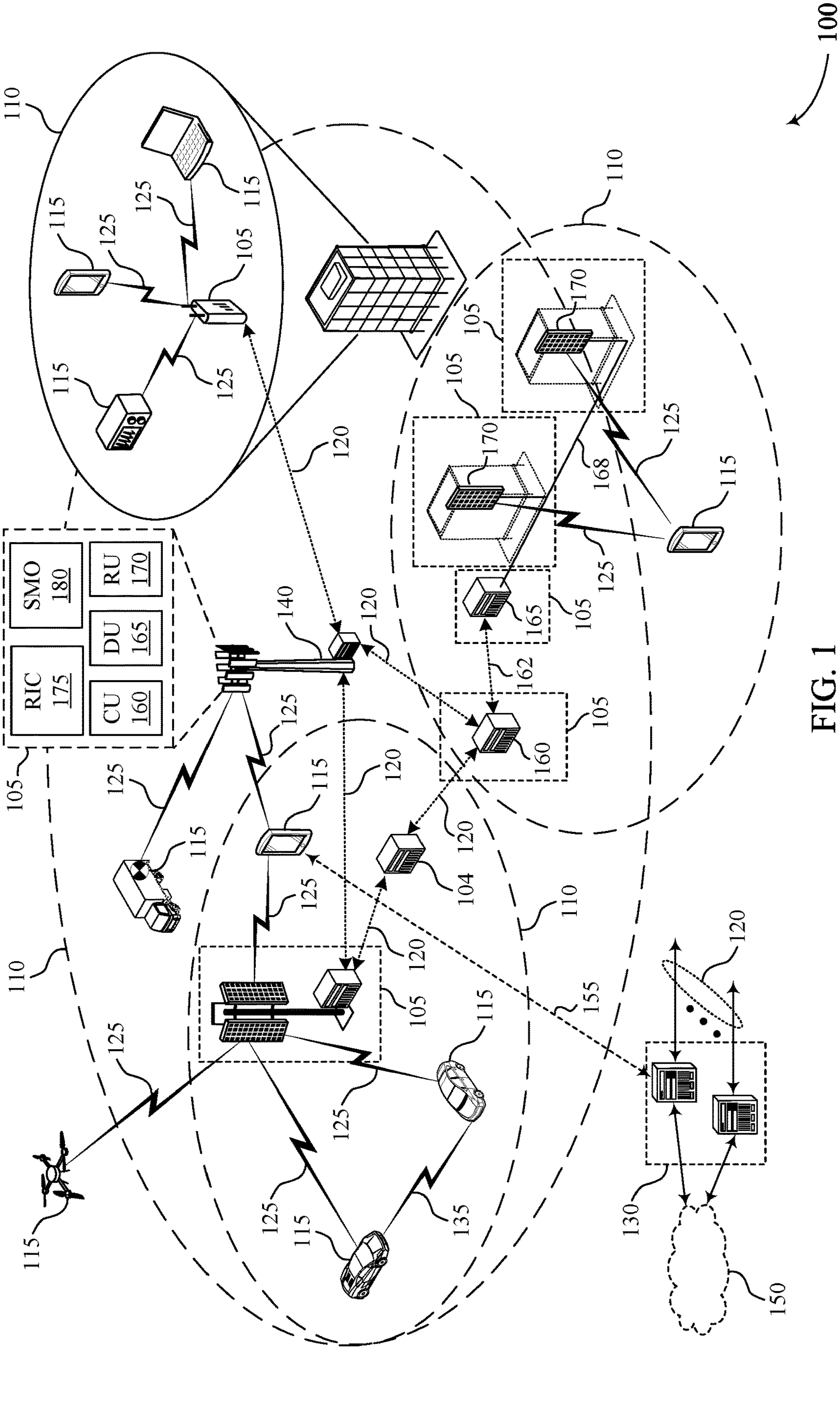
FIGS. 1 and 2 illustrate aspects of a wireless communications system that supports coverage enhancement for contention-free random access (CFRA) in accordance with one or more aspects of the present disclosure.

A user equipment (UE) (an aspect of a network node) may perform a random access procedure to establish a connection with a network entity such as a base station or a component of a base station (another aspect of a network node). In some wireless communication systems, there are different types of random access procedures: contention-based random access (CBRA) and contention-free random access (CFRA). One difference between CBRA and CFRA is that, in CBRA, the UE randomly selects a preamble from a pool of preambles, while in CFRA, the UE is assigned a preamble. In that way, using an assigned preamble, the UE is able to participate in a random access procedure without contention.

In some aspects, some random access messages exchanged between the UE and the network entity during the random access procedure may fail. A random access process may include a number of different uplink and downlink messages. Typically, a first uplink message from a UE (often referred to as a Msg1 in a random access procedure) includes the selected or assigned preamble. In response to transmitting Msg1, the UE may receive a response in the form of a Msg2. The UE may then transmit Msg3. In some aspects, the network entity may not receive a scheduled uplink transmission (e.g., Msg3) from the UE. The scheduled uplink transmission may include information such as uplink timing information among other information essential to the random access procedure. As such, techniques for enhanced coverage for random access procedures may be desired. In particular, enhanced coverage techniques for Msg3 transmission may be beneficial.

The aspects described herein may allow for CFRA coverage enhancement. In other words, a UE may be configured to transmit a Msg3 with coverage enhancement during a CFRA procedure. The coverage enhancement may include repetition of the Msg3 transmission. In order to transmit Msg3 with repetitions, the UE is scheduled for the repetitions. Thus, the network entity may include a schedule for the Msg3 repetitions in a transmission to the UE. In some aspects, the UE may request the coverage enhancement, and in other aspects, the network entity may determine that coverage enhancement should be scheduled.

In an aspect when the UE requests Msg3 CFRA coverage enhancement, the UE may perform measurements (e.g., reference signal received power (RSRP) measurements) on reference signals received from the network entity. The UE may compare the measurements to any one or more of a number of thresholds, including a first threshold, a second threshold greater than the first threshold, and a third threshold greater than the second threshold. If the measurements are greater than the second threshold, but less than the third threshold, the UE may perform CFRA with coverage enhancement. In one option, the UE may be assigned two preambles: a first preamble for CFRA and a second preamble for CFRA with coverage enhancement. When the UE determines that the random access is to be a CFRA procedure with coverage enhancement, the UE may transmit the second preamble (in Msg1) to the network entity and the network entity may schedule the UE to transmit the scheduled uplink transmission (Msg3) at some repetition. In another aspect, the network entity may configure the UE with different sets of random access occasions, a first set of random access occasions associated with CFRA without coverage enhancement and a second set of random access occasions associated with CFRA with coverage enhancement. In the coverage enhancement scenario, the UE may transmit a random access message (Msg1) over the second set of random access occasions. In either option, the network entity may receive the Msg1 and may determine that the preamble used or the random access occasions used correspond to a request for coverage enhancement of an upcoming Msg3. The network entity may then provide a Msg3 configuration (with repetition) to the UE via a Msg2.

In a more network-based solution, and during radio resource control (RRC) reconfiguration, a target network entity (e.g., a target base station) may receive a measurement report indicating the link quality in the target cell which may be used to determine whether the UE may use coverage enhancement CFRA. If the network entity determines that it may be beneficial for the UE to use coverage enhancement, the network entity may schedule the UE to transmit the scheduled uplink transmission (Msg3) at some repetition. The UE may identify the repetition at which to transmit the scheduled uplink transmission based on an RRC configuration message received from the network entity or the repetition may be indicated in a grant (e.g., Msg2) scheduling the scheduled uplink transmission.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to coverage enhancement for CFRA.

FIG. 1 illustrates an aspect of a wireless communications system 100 that supports coverage enhancement for CFRA in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some aspects, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an aspect of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another aspect, a network node may be a base station or network entity. As another aspect, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these aspects. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific aspect is broadened in accordance with this disclosure (e.g., a UE is configured to receive information from a base station also discloses that a first network node is configured to receive information from a second network node), the broader aspect of the narrower aspect may be interpreted in the reverse, but in a broad open-ended way. In the aspect above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this aspect and consistent with this disclosure, disclosure that the first network node is configured to transmit information to the second network node includes disclosure that the first network node is configured to provide, send, output, communicate, or transmit information to the second network node. Similarly, in this aspect and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another over a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (MC) 175 (e.g., a Near-Real Time MC (Near-RT MC), a Non-Real Time MC (Non-RT MC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 175 is flexible and may support different functionalities depending upon which functions (e.g., network layer functions, protocol layer functions, baseband functions, radio frequency functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an aspect of a portion of backhaul link, and may communicate with other CUs 160 (e.g., a CU 160 associated with an alternative IAB donor) over an Xn-C interface, which may be an aspect of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support coverage enhancement for CFRA as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other aspects, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some aspects, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other aspects.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be able to communicate directly with other UEs 115 over a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some aspects, one or more UEs 115 in such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, the wireless communications system 100 may support CFRA with coverage enhancement. That is, during a CFRA procedure, the network entity 105 may schedule the UE 115 to transmit an uplink message (Msg3) with a repetition. In one aspect, the decision to perform CFRA with coverage enhancement may be made at the UE 115. For example, the UE 115 may determine to perform CFRA with coverage enhancement based on measurements made of one or more received reference signals. The UE 115 may indicate the decision to perform CFRA with coverage enhancement by including a preamble configured for CFRA with coverage enhancement in a random access message (Msg1) or transmitting the random access message (Msg1) over a set of random access occasions configured for CFRA with coverage enhancement. The network entity 105 may then schedule the UE 115 to transmit an uplink message with the repetition. In another aspect, the network may determine for the UE 115 to perform CFRA with coverage enhancement based on a measurement report obtained during a handover procedure. The network entity 105 may indicate to transmit the random access message at the repetition via a configuration message or a random access response message (Msg2). The methods as described herein may allow a UE 115 to repeatedly transmit an uplink message as part of a CFRA procedure which may increase the probability of receiving the uplink message at the base station thereby enhancing coverage.

Figure 2:
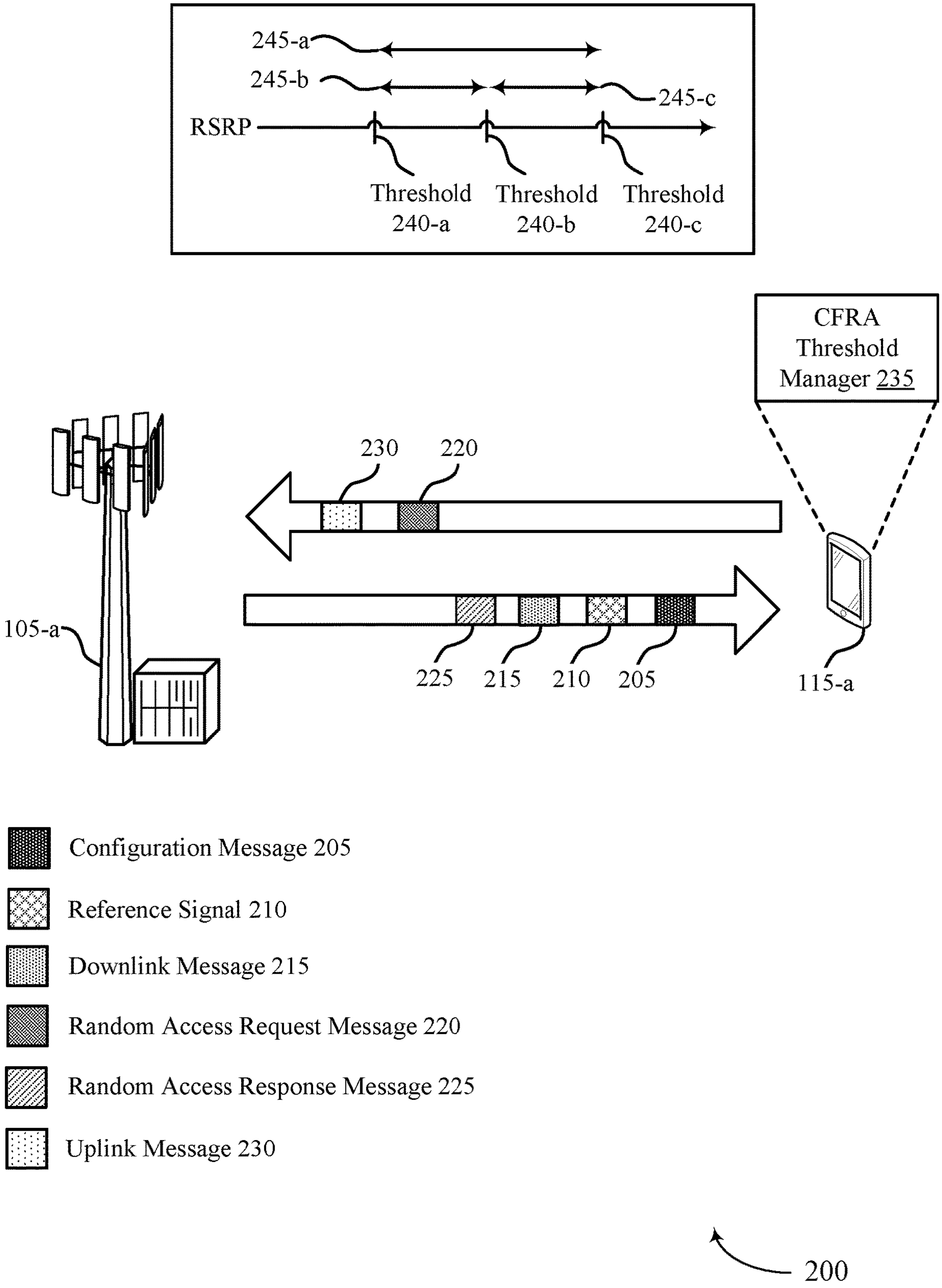

FIG. 2 illustrates an aspect of a wireless communications system 200 that supports coverage enhancement for CFRA in accordance with one or more aspects of the present disclosure. In some aspects, the wireless communications system 200 may implement aspects of a wireless communications system 100. For example, the wireless communications system 200 may include a network entity 105-*a* and a UE 115-*a* which may be aspects of a network entity 105 and a UE 115 as described with reference to FIG. 1.

In some aspects, the UE 115-*a* may perform a random access procedure. The UE 115-*a* may perform one of two different random access procedures. For example, the UE 115-*a* may perform a CBRA procedure or a CFRA procedure. In some aspects, the UE 115-*a* may utilize CBRA for initial RRC connection setup, RRC connection establishment, or during a handover procedure and in some aspects, the UE 115-*a* may utilize CFRA for a handover procedure or non-standalone (NSA) cell addition. Before performing the random access procedure, the UE 115-*a* may receive a configuration message 205 from the network (e.g., the network entity 105-*a*). The configuration message 205 may include information that the UE 115-*a* may utilize during the random access procedure. For example, the configuration message 205 may include an indication of resources (e.g., a set of random access occasions) to use during the random access procedure, one or more thresholds 240, an indication of a directional beam (e.g., candidate beam) to use to transmit a random access message, etc.

In some aspects, the UE 115-*a* may determine which random access procedure to perform (e.g., either CBRA or CFRA). To determine which random access procedure to use, the UE 115-*a* may utilize the thresholds 240 indicated in the configuration message 205. For example, the UE 115-*a* may receive one or more reference signals 210 from the network entity 105-*a* using the directional beam indicated in the configuration message 205 and measure the one or more reference signals 210 to determine a parameter. An aspect of the parameter may be an RSRP value. Upon determining the parameter, the UE 115-*a* may compare the parameter to a threshold 240-*a* and a threshold 240-*c*. If the parameter falls within the range 245-*a* between the threshold 240-*a* and the threshold 240-*c*, the UE 115-*a* may determine to perform CBRA. Alternatively, if the parameter is not within the range 245-*a* and is less than the threshold 240-*a*, the UE 115-*a* may determine to perform CBRA with coverage enhancement. Additionally, if the parameter is not within the range 245-*a* and is greater than the threshold 240-*c*, the UE 115-*a* may determine to perform CFRA.

In some aspects, the UE 115-*a* may determine to perform the CBRA procedure. To perform the CBRA procedure, the UE 115-*a* may randomly select a preamble and transmit the preamble to the network entity 105-*a* in a random access request message 220. Upon receiving the random access request message 220, the network entity 105-*a* may transmit a random access response message 225, where the random access response message 225 includes a resource grant for an uplink message 230. The UE 115-*a* may then transmit the uplink message 230 to the network entity 105-*a* according to the resource grant and the network entity 105-*a* and the UE 115-*a* may undergo a contention resolution procedure. In another aspect, the UE 115-*a* may determine to perform CBRA with coverage enhancement. Coverage enhancement may allow for an increase in the probability that the network entity 105-*a* receives a random access message (e.g., the uplink message 230) during the random access procedure. To perform CBRA with coverage enhancement, the UE 115-*a* may randomly select a preamble from a set of preamble reserved for coverage enhancement and transmit the preamble to the network entity 105-*a* in the random access request message 220. The selected preamble may serve as a request to schedule the uplink message 230 with repetition. The network entity 105-*a* may then schedule the UE 115-*a* to transmit the uplink message 230 at the repetition using the random access response message 225. Repeatedly transmitting the uplink message 230 may increase the probability that the network entity 105-*a* receives the uplink message 230 resulting in coverage enhancement.

In some aspects, the UE 115-*a* may determine the perform the CFRA procedure. To perform the CFRA procedure, the UE 115-*a* may receive a downlink message 215 (e.g., a first message) that includes an indication of a preamble allocated to the UE 115-*a* for use during the CFRA procedure. Upon receiving the downlink message 215, the UE 115-*a* may transmit the random access request message 220 to the network entity 105-*a* that includes the preamble to initiate the CFRA procedure. In some aspects, the UE 115-*a* may transmit the random access request message 220 over the set of random access occasions indicated in the configuration message 205. In response to the random access request message 220, the network entity 105-*a* may transmit a random access response message 225 to the UE 115-*a*. The random access response message may include a resource grant for the uplink message 230. The UE 115-*a* may transmit the uplink message 230 (e.g., a second message) to the network entity 105-*a* according to the resource grant to complete the CFRA procedure. In some aspects, if the network entity 105-*a* does not detect the uplink message 230, the network entity 105-*a* may assume that the random access request message 220 was a false decode and the CFRA procedure may fail. As such, it may be beneficial to perform CFRA with coverage enhancement.

As described herein, the UE 115-*a* may perform CFRA with coverage enhancement. To enhance coverage, the UE 115-*a* may transmit the uplink message 230 to the network entity 105-*a* with repetition or over multiple instances. In one aspect, the UE 115-*a* may determine whether to perform CFRA with coverage enhancement and indicate its decision to the network entity 105-*a*. In such example, the UE 115-*a* may include a CFRA threshold manager 235. The CFRA threshold manager 235 may be configured to compare a parameter (e.g., an RSRP value) to the threshold 240-*a*, a threshold 240-*b*, and the threshold 240-*c* in order to determine whether the UE 115-*a* will perform CBRA, CBRA with coverage enhancement, CFRA, or CFRA with coverage enhancement. That is, the threshold 240-*b* may be added between the threshold 240-*a* and the threshold 240-*c*. As shown in FIG. 2, the threshold 240-*a* may be less than the threshold 240-*b* which may be less than the threshold 240-*c*. As described above, the UE 115-*a* may determine the parameter based on measurements made of the one or more reference signals 210 received from the network entity 105-*a*. If the parameter falls within the range 245-*b* between the threshold 240-*a* and the threshold 240-*b*, the UE 115-*a* may determine to perform CBRA. Alternatively, if the parameters falls within the range 245-*c* between the threshold 240-*b* and the threshold 240-*c*, the UE 115-*a* may determine to perform CFRA with coverage enhancement. Alternatively, if the parameter is not within the range 245-*b* and the range 245-*c* and is less than the threshold 240-*a*, the UE 115-*a* may determine to perform CBRA with coverage enhancement. Additionally, if the parameter is not within the range 245-*b* and the range 245-*c* and is less than the threshold 240-*c*, the UE 115-*a* may determine to perform CFRA.

In some aspects, the UE 115-*a* may determine to perform CFRA with coverage enhancement. To perform CFRA with coverage enhancement, the UE 115-*a* may receive the configuration message 205. In some aspects, the configuration message 205 may include an indication of two different sets of random access occasions. A first set of random access occasions may be for CFRA with coverage enhancement (e.g., corresponds to transmission of the uplink message 230 with repetition) and a second set of random access occasions may be for CFRA (e.g., corresponds to transmission of the uplink message 230 without repetition). Upon receiving the configuration message 205, the UE 115-*a* may receive the downlink message 215 from the network entity 105-*a*. In some aspects, the downlink message 215 may include an indication of two different preambles. A first preamble may be allocated to the UE 115-*a* for use in the CFRA procedure with coverage enhancement and the second preamble may be allocated to the UE 115-*a* for use in the CFRA procedure.

In response to the downlink message 215, the UE 115-*a* may transmit the random access request message 220 to the network entity 105-*a*. In some aspects, the UE 115-*a* may use the random access request message 220 to indicate whether the UE 115-*a* is performing CFRA or CFRA with coverage enhancement. That is, the random access request message 220 may serve as request for the network entity 105-*a* to schedule the UE 115-*a* to transmit the uplink message 230 at a repetition in the case that CFRA with coverage enhancement is selected by the UE 115-*a*. In one case, to indicate CFRA with coverage enhancement, the UE 115-*a* may transmit the random access request message 220 over the first set of random access occasions. The network entity 105-*a* may determine that the UE 115-*a* is requesting coverage enhancement of the uplink message 230 based on receiving the random access request message 220 over the first set of random access occasions. Alternatively, the UE 115-*a* may include an indication of the first preamble in the random access request message 220. The network entity 105-*a* may determine that the UE 115-*a* is requesting coverage enhancement of the uplink message 230 based receiving the first preamble as opposed to the second preamble. Upon receiving the random access request message 220, the network entity 105-*a* may transmit the random access response message 225 to the UE 115-*a*. In the case that the UE 115-*a* request CFRA with coverage enhancement, the random access response message 225 may include a resource grant for the uplink message 230 as well as a repetition level associated with the uplink message 230. The repetition level may refer to a quantity of times that the UE 115-*a* may repeatedly transmit the uplink message 230 over resources of the resource grant. In response to the random access response message 225, the UE 115-*a* may transmit the uplink message 230 to the network entity 105-*a* according to the resource grant and the repetition level.

In another aspect, the decision to perform CFRA with coverage enhancement may be made at the network side. Such scenario may occur when the UE 115-*a* is performing a handover (e.g., RRC reconfiguration with a sync procedure) from a source base station to a target base station. The network entity 105-*a* may be an aspect of the target base station. During a handover, the source base station may retrieve a measurement report from the UE 115-*a* and in some aspects, forward the measurement report to the network entity 105-*a*. Using the measurement report, the network (e.g., network entity 105-*a* or the source base station) may determine whether the UE 115-*a* should perform CFRA with coverage enhancement (e.g., transmit the uplink message 230 at a repetition). In one aspect, once the network determines to have the UE 115-*a* perform CFRA with coverage enhancement, the network (e.g., the source base station) may transmit the configuration message 205 that includes an information element for CFRA. The information element may include an indicator of whether the uplink message 230 should be transmitted with repetition or without repetition. For example, if the network determines to use CFRA with coverage enhancement, the information element may include an indication of a repetition level for the uplink message. Upon receiving the configuration message 205, the UE 115-*a* may receive the downlink message 215 including the preamble allocated to the UE 115-*a* for use in the CFRA with enhancement and transmit the random access request message 220 including the preamble. The network entity 105-*a* may receive the random access request message 220 and transmit the random access response message 225 to the UE 115-*a*. The random access response message 225 may include a resource grant for the uplink message 230. Upon receiving the random access response message 225, the UE 115-*a* may then transmit the uplink message 230 according to the resource grant included in the random access response message 225 and the repetition level indicated in the configuration message 205.

In another aspect, the network entity 105-*a* may include an indicator of whether the uplink message 230 should be transmitted with repetition or not in the random access response message 225. In such example, the UE 115-*a* may receive the downlink message 215 including the preamble allocated to the UE 115-*a* for use in the CFRA procedure with coverage enhancement and transmit the random access request message 220 including the preamble. The network entity 105-*a* may receive the random access request message 220 and transmit the random access response message 225 to the UE 115-*a*, where the random access response message 225 includes a resource grant and a bit field that is associated with a cell-radio network temporary identifier (C-RNTI). Because the C-RNTI may not be utilized in CFRA, the bit field may be repurposed to include the indication. In the case that the network entity 105-*a* determines for the UE 115-*a* to use CFRA with coverage enhancement, the bit field may include an indication of the repetition level. In response to the random access response message 225, the UE 115-*a* may transmit the uplink message 230 according to the resource grant and the repetition level included in the random access response message 225. Using the techniques as describe herein may allow a network entity 105-*a* and a UE 115-*a* to enhance coverage of random access messages which may increase the efficiency of random access procedures.

Figure 3:
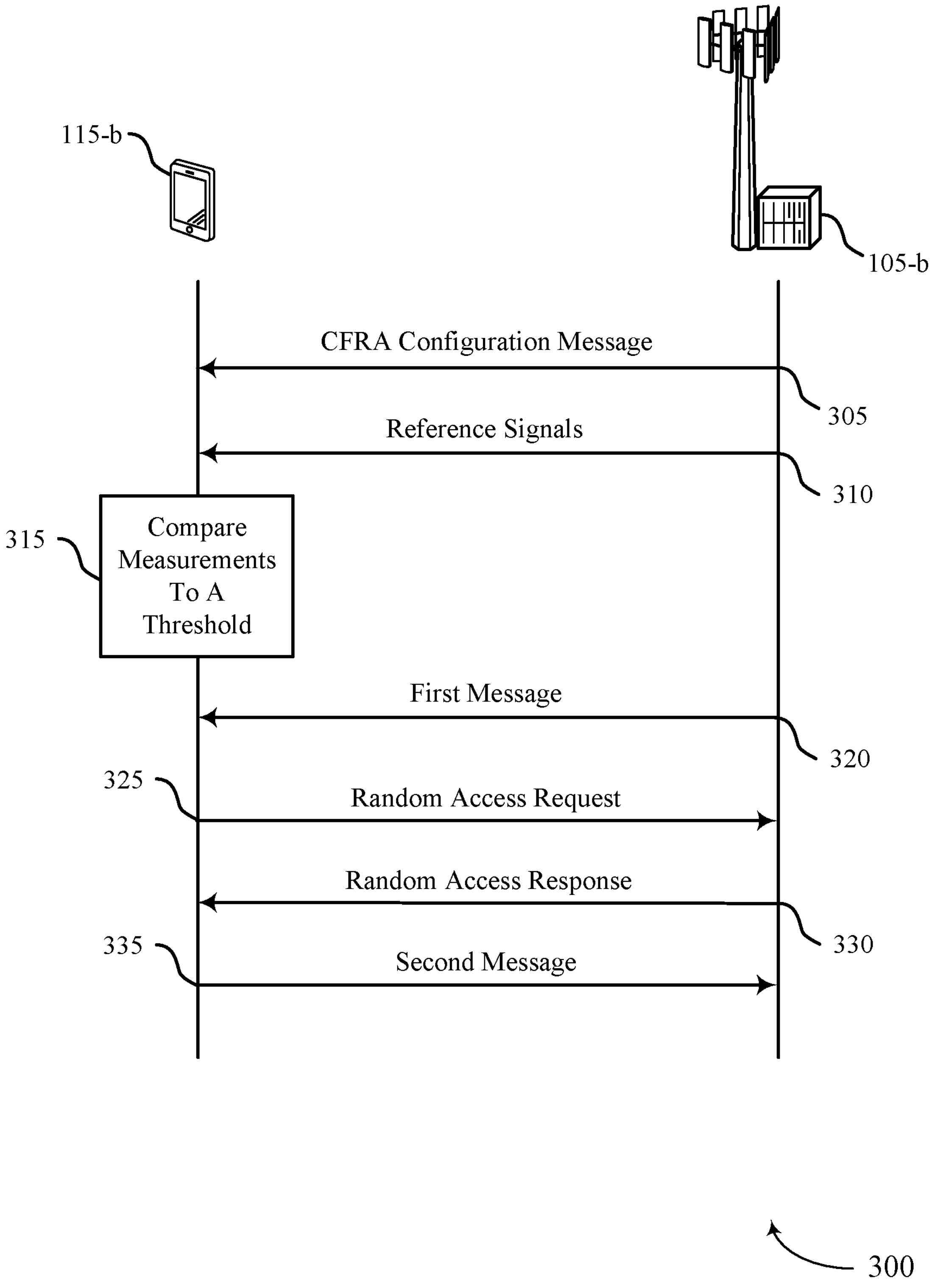
FIGS. 3 and 4 illustrate aspects of process flows that supports coverage enhancement for CFRA in accordance with one or more aspects of the present disclosure.

FIG. 3 illustrates an aspect of a process flow 300 that supports coverage enhancement for CFRA in accordance with one or more aspects of the present disclosure. In some aspects, the process flow 300 may implement or be implemented by aspects of a wireless communications system 100 and a wireless communications system 200. For example, the process flow 300 may include a UE 115-*b* and a network entity 105-*b* as described in FIGS. 1 and 2. In some aspects, the UE 115-*b* and the network entity 105-*b* may otherwise be known as a network node. Alternative aspects of the following may be implemented, where some steps are performed in a different order then described or are not performed at all. In some cases, steps may include additional features not mentioned below, or further steps may be added.

At 305, the UE 115-*b* may receive a CFRA configuration message from the network (e.g., the network entity 105-*b*). The CFRA configuration message may include an indication one or more sets of random access occasions. For example, the CFRA configuration message may include a first set of random access occasions and a second set of random access occasions. The first set of random access occasions may be associated with repetition based transmission of a second message and the second set of random access occasions may be associated with transmission of the second message without repetition. Additionally, the CFRA configuration message may include an indication of one or more thresholds. The one or more thresholds may include a first threshold, a second threshold, and a third threshold. The first threshold may correspond to a first type of random access procedure (e.g., a CBRA procedure with coverage enhancement), the second threshold may correspond to a second type of random access procedure (e.g., a CFRA procedure with coverage enhancement), and the third threshold may correspond to a third type of random access procedure (e.g., a CFRA procedure)

At 310, the UE 115-*b* may receive one or more reference signals from the network entity 105-*b*. In some aspects, the UE 115-*b* may measure the one or more reference signals resulting in one or more measurements. The one or more measurements may include an RSRP value.

At 315, the UE 115-*b* may determine whether to request resources for repetition based transmission of the second message (e.g., perform CFRA with coverage enhancement) or request resource for transmission of the second message without repetition (e.g., CFRA). In some examples, the UE 115-*b* may determine to request resources for repetition based transmission upon satisfaction of one or more conditions associated with repetition based transmission of the second message. In one aspect, the UE 115-*b* may compare the one or more measurements against one or more of the first threshold, the second threshold, or the third threshold. The first threshold may be less than the second threshold which is less than the third threshold. In some aspects, the satisfaction of the one or more conditions may include a parameter (e.g., one or more measurements) being greater than the second threshold and less than the third threshold. In some aspects, the values of the first threshold, the second threshold, and the third threshold may be indicated to the UE 115-*b* via the CFRA configuration message received at 305.

At 320, the UE 115-*b* may receive a first message from the network (e.g., the network entity 105-*b*). The first message may include an indication of one or more preambles allocated to the UE 115-*b* for a random access procedure (e.g., CFRA procedure). The one or more preambles may include a first preamble associated with repetition based transmission of a second message and a second preamble associated with transmission of the second message without repetition. In some aspects, the first message may be an aspect of a downlink message.

At 325, the UE 115-*b* may transmit a random access request message. The random access request message may include an indication of whether the UE 115-*b* requests resources for repetition based transmission of a second message or transmission of the second message without repetition. In one aspect, the UE 115-*b* may request resources for repetition based transmission of the second by selecting the first preamble and including an indication of the first preamble in the random access request message. In another aspect, the UE 115-*b* may request resources for repetition based transmission of the second message by transmitting the random access request message over resources of the first set of random access occasions. In some aspects, the second message may be an aspect of an uplink message.

At 330, the UE 115-*b* may receive a random access response message from the network entity 105-*b*. In the case that the UE 115-*b* requests for resources for repetition based transmission of the second message, the random access response message may include a resource grant for as well as a repetition level at which to transmit the second message. In some aspects, the UE 115-*b* may decode the random access response message based on the satisfaction of the one or more conditions.

At 335, the UE 115-*b* may transmit the second message to the network entity 105-*b*. In some aspects, the UE 115-*b* may transmit the second message to the network entity 105-*b* according to the resource grant and the repetition level indicated in the random access response message received at 330.

Figure 4:
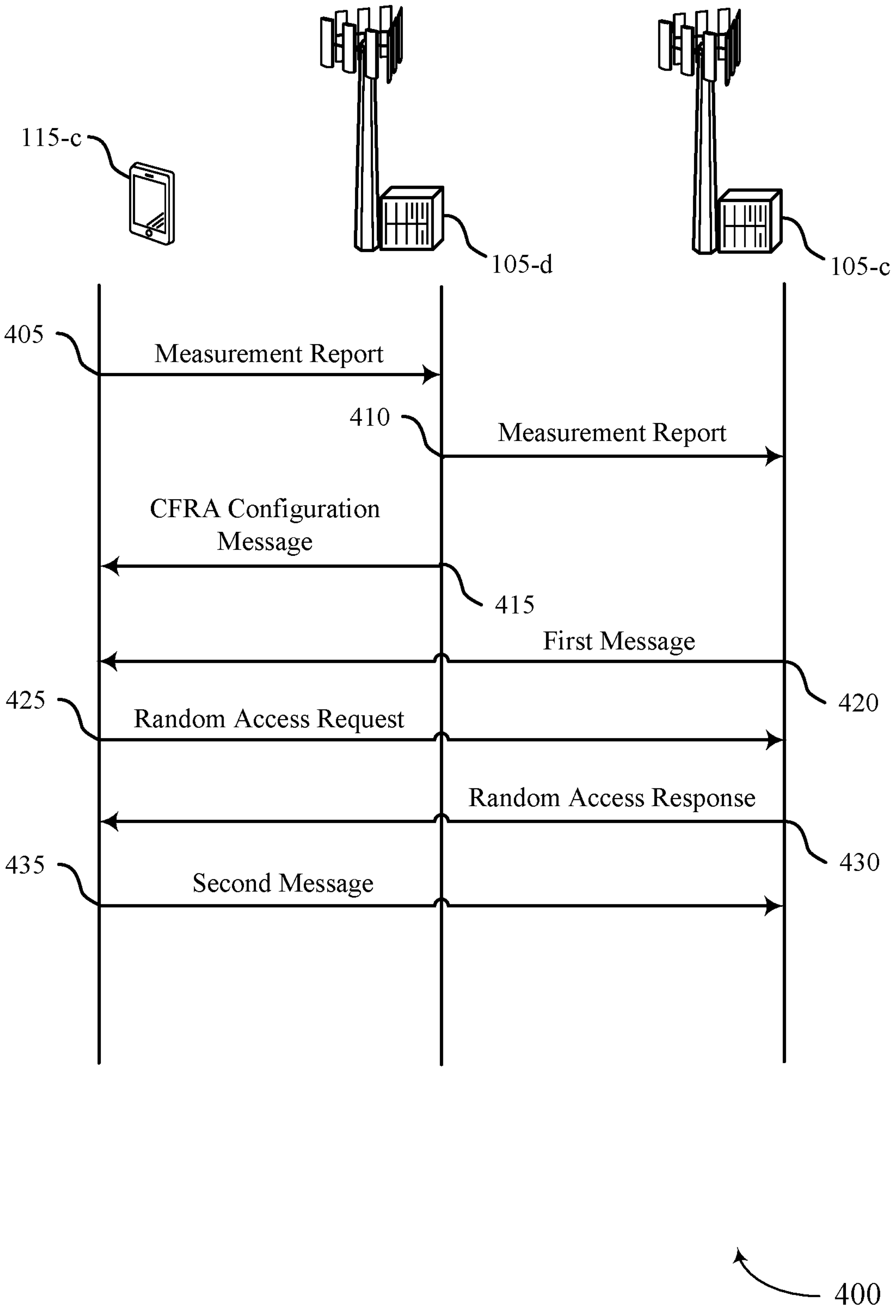

FIG. 4 illustrates an aspect of a process flow 400 that supports coverage enhancement for CFRA in accordance with one or more aspects of the present disclosure. In some aspects, the process flow 400 may implement aspects of a wireless communications system 100 and a wireless communications system 200. For example, the process flow 400 may include a UE 115-*c*, a network entity 105-*c*, and a network entity 105-*d* which may be aspects of a UE 115 and a network entity 105 as described with reference to FIGS. 1 and 2. In some aspects, the UE 115-*c* and the network entities 105 may otherwise be known as network nodes. Alternative aspects of the following may be implemented, where some steps are performed in a different order then described or are not performed at all. In some cases, steps may include additional features not mentioned below, or further steps may be added.

In some aspects, the UE 115-*c* may perform a handover procedure. A handover procedure may allow the UE 115-*c* to move from a source base station to a target base station. Network entity 105-*d* may be an aspect of the source base station and network entity 105-*c* may be an aspect of the target base station.

At the start of the handover procedure, the UE 115-*c* may provide the network with a measurement report. The measurement report may include information indicative of a link quality between the UE 115-*c* and the network entity 105-*c*. In some aspects, the UE 115-*c* may transmit the measurement report to the source base station and in some aspects, the source base station may transmit the measurement report to the target base station. For example, at 405, the UE 115-*c* may transmit the measurement report to the network entity 105-*d* and at 410, the network entity 105-*d* may transmit the measurement report to the network entity 105-*c*.

At 410, upon receiving the measurement report, the network (e.g., the network entity 105-*c* or the network entity 105-*d*) may determine a random access procedure to perform as part of the handover procedure. In some aspects, the network may utilize the measurement report to determine the random access procedure. If the measurement report indicates a poor link quality (e.g., below a threshold), the network may determine to perform CFRA with coverage enhancement. Alternatively if the measurement report indicates a good link quality (e.g., above a threshold), the network may determine to perform CFRA.

At 415, the UE 115-*c* may receive a configuration message from the network (e.g., the network entity 105-*d* or the source base station) that includes a set of parameters for performing CFRA or CFRA with coverage enhancement. In one aspect, the network may determine to perform CFRA with coverage enhancement. In such example, the configuration message may include an information element that includes an indication of whether a second message is to be transmitted at a repetition (e.g., according to a repetition level) or without a repetition. That is, in the case that CFRA with coverage enhancement is selected, the information element may include a repetition level or a number of instances for which to repeat transmission of the second message. In some aspects, the CFRA configuration message may be transmitted to the UE 115-*c* via RRC signaling. In some aspects, the configuration message may also include an indication of one or more thresholds. For example, the CFRA configuration message may include an indication of a first threshold. The UE 115-*c* may determine to use CFRA if an RSRP value of received reference signals exceeds the first threshold and determine to use CBRA if an RSRP value of received reference signals is smaller than the first threshold.

At 420, the UE 115-*c* may receive a first message from the network (e.g., from the network entity 105-*c* or the target base station). If the UE 115-*c* and the network determine to perform CFRA or CFRA with coverage enhancement, the first message may include a preamble allocated to the UE 115-*c* for use during CFRA or CFRA with coverage enhancement. In some aspects, the first message may be an aspect of a downlink message.

At 425, the UE 115-*c* may transmit a random access request to the network entity 105-*c*. The random access request may initiate CFRA or CFRA with coverage enhancement and include an indication of the preamble allocated to the UE 115-*c*.

At 430, the network entity 105-*c* may transmit a random access response to the UE 115-*c*. The random access response may include a resource grant for the second message. In some aspects, the UE 115-*c* may decode the random access response based on the indication of whether the second message is to be transmitted at a repetition included in the CFRA configuration message. That is, if CFRA with coverage enhancement is selected, the UE 115-*c* may decode the random access response with the knowledge that the second message is to be transmitted over resources of the resource grant according to a repetition level indicated in the configuration message.

Alternatively, the random access response message may include an indication of whether a second message is to be transmitted at a repetition (e.g., according to a repetition level). That is, in the case that CFRA with coverage enhancement is selected, the random access response may include a repetition level or a number of instances for which to repeat transmission of the second message. In some aspects, the random access response may include a bit field for a C-RNTI. In some instances, the C-RNTI is not utilized during a CFRA or a CFRA with coverage enhancement and as such, the bit field for C-RNTI may be repurposed to include the indication. That is, the UE 115-*c* may determine to support repetition based transmission of the second message upon satisfaction of one or more conditions which may include reception the CFRA configuration message indicative of repetition based transmission at 405 or reception of the random access response indicative of repetition based transmission at 430.

At 435, the UE 115-*c* may transmit the second message to the network entity 105-*c* over the resources of the resource grant included in the random access response message. If CFRA with coverage enhancement is selected, the UE 115-*c* may transmit the second message according to the repetition level indicated in the configuration message or the random access response message. In some aspects, the second message may be an aspect of a second message.

Figure 5:
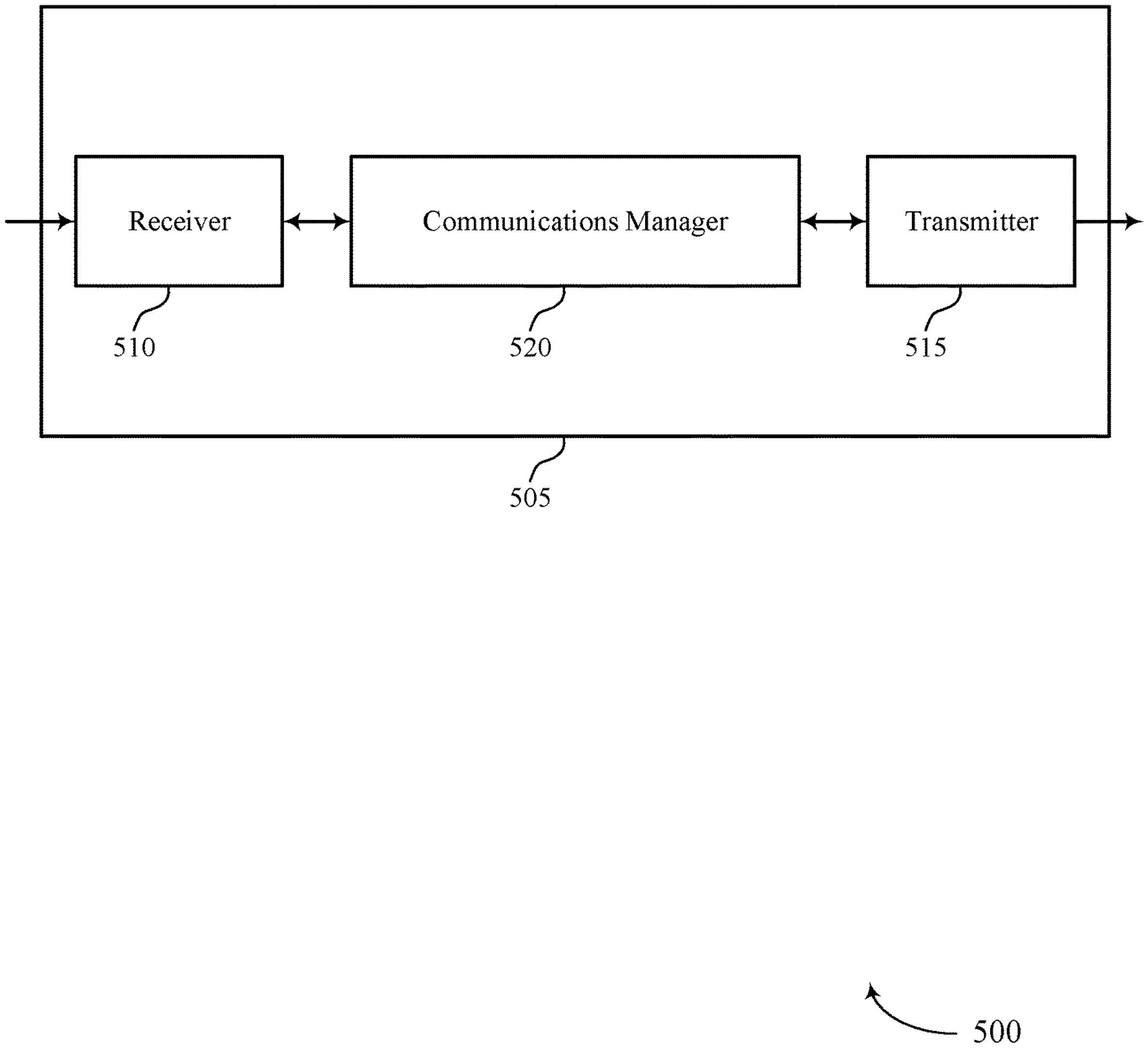
FIGS. 5 and 6 show block diagrams of devices that support coverage enhancement for CFRA in accordance with one or more aspects of the present disclosure.

FIG. 5 shows a block diagram 500 of a device 505 that supports coverage enhancement for CFRA in accordance with one or more aspects of the present disclosure. The device 505 may be an aspect of aspects of a UE 115 (or a network node) as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to coverage enhancement for CFRA). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to coverage enhancement for CFRA). In some aspects, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of coverage enhancement for CFRA as described herein. For example, the communications manager 520, the receiver 510, the transmitter 515, or various combinations or components thereof may support a method for performing one or more of the functions described herein.

In some aspects, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network node in accordance with aspects as disclosed herein. For example, the communications manager 520 may be configured as or otherwise support a means for receiving a first message that indicates a first preamble allocated to the first network node for a random access procedure. The communications manager 520 may be configured as or otherwise support a means for transmitting, as part of the random access procedure, a random access request message including the first preamble. The communications manager 520 may be configured as or otherwise support a means for receiving, as part of the random access procedure and responsive to the random access request message, a random access response message including a resource grant for a second message, where the random access response message is decoded based on satisfaction of one or more conditions associated with repetition based transmission of the second message. The communications manager 520 may be configured as or otherwise support a means for transmitting, as part of the random access procedure, the second message with repetition in accordance with the resource grant.

By including or configuring the communications manager 520 in accordance with aspects as described herein, the device 505 (e.g., a processor controlling or otherwise coupled with the receiver 510, the transmitter 515, the communications manager 520, or a combination thereof) may support techniques for more efficient utilization of communication resources. Allowing for the device 505 to repeatedly transmit a random access message during a random access procedure may decrease the likelihood of the random access procedure failing and reattempting the random access procedure which may reduce the overall resources allocated to random access procedure.

Figure 6:
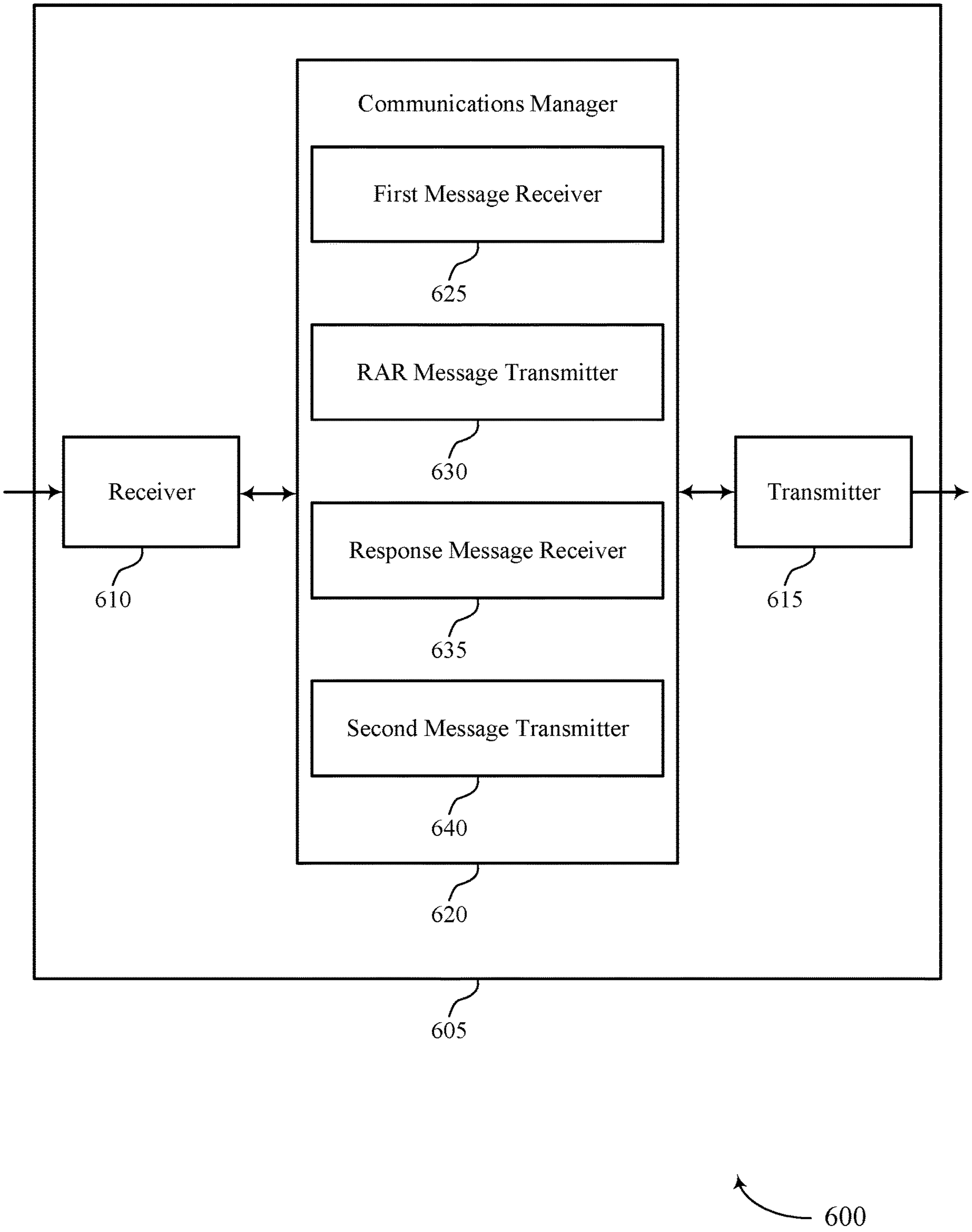

FIG. 6 shows a block diagram 600 of a device 605 that supports coverage enhancement for CFRA in accordance with one or more aspects of the present disclosure. The device 605 may be an example of aspects of a device 505 or a UE 115 (or a network node) as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to coverage enhancement for CFRA). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coverage enhancement for CFRA). In some aspects, the transmitter 615 may be co-located with a receiver 610 in a transceiver module. The transmitter 615 may utilize a single antenna or a set of multiple antennas.

The device 605, or various components thereof, may be an example of means for performing various aspects of coverage enhancement for CFRA as described herein. For example, the communications manager 620 may include a first message receiver 625, a RAR message transmitter 630, a response message receiver 635, a second message transmitter 640, or any combination thereof. The communications manager 620 may be an example of aspects of a communications manager 520 as described herein. In some aspects, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network node in accordance with aspects as disclosed herein. The first message receiver 625 may be configured as or otherwise support a means for receiving a first message that indicates a first preamble allocated to the first network node for a random access procedure. The RAR message transmitter 630 may be configured as or otherwise support a means for transmitting, as part of the random access procedure, a random access request message including the first preamble. The response message receiver 635 may be configured as or otherwise support a means for receiving, as part of the random access procedure and responsive to the random access request message, a random access response message including a resource grant for a second message, where the random access response message is decoded based on satisfaction of one or more conditions associated with repetition based on transmission of the second message. The second message transmitter 640 may be configured as or otherwise support a means for transmitting, as part of the random access procedure, the second message with repetition in accordance with the resource grant.

Figure 7:
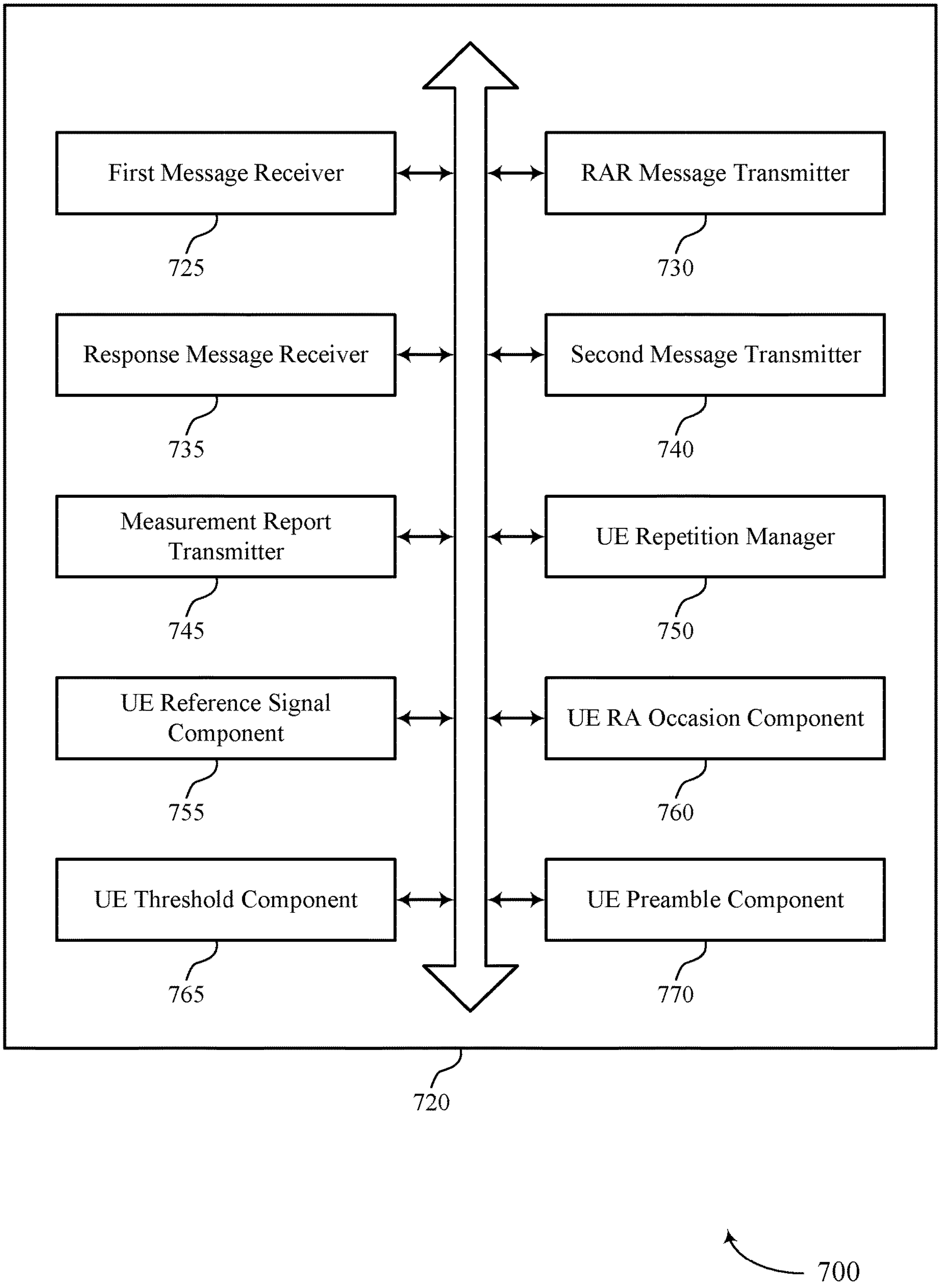
FIG. 7 shows a block diagram of a communications manager that supports coverage enhancement for CFRA in accordance with one or more aspects of the present disclosure.

FIG. 7 shows a block diagram 700 of a communications manager 720 that supports coverage enhancement for CFRA in accordance with one or more aspects of the present disclosure. The communications manager 720 may be an example of aspects of a communications manager 520, a communications manager 620, or both, as described herein. The communications manager 720, or various components thereof, may be an example of means for performing various aspects of coverage enhancement for CFRA as described herein. For example, the communications manager 720 may include a first message receiver 725, a RAR message transmitter 730, a response message receiver 735, a second message transmitter 740, a measurement report transmitter 745, a UE repetition manager 750, a UE reference signal component 755, a UE RA occasion component 760, a UE threshold component 765, a UE preamble component 770, or any combination thereof. Each of these components may communicate, directly or indirectly, with one another (e.g., via one or more buses).

The communications manager 720 may support wireless communication at a first network node in accordance with aspects as disclosed herein. The first message receiver 725 may be configured as or otherwise support a means for receiving a first message that indicates a first preamble allocated to the first network node for a random access procedure. The RAR message transmitter 730 may be configured as or otherwise support a means for transmitting, as part of the random access procedure, a random access request message including the first preamble. The response message receiver 735 may be configured as or otherwise support a means for receiving, as part of the random access procedure and responsive to the random access request message, a random access response message including a resource grant for a second message, where the random access response message is decoded based on satisfaction of one or more conditions associated with repetition based transmission of the second message. The second message transmitter 740 may be configured as or otherwise support a means for transmitting, as part of the random access procedure, the second message with repetition in accordance with the resource grant and with repetition.

In some aspects, transmission of the random access request message is indicative of a request by the first network node to perform the repetition based transmission of the second message.

In some aspects, the UE reference signal component 755 may be configured as or otherwise support a means for receiving one or more reference signals. In some aspects, the UE reference signal component 755 may be configured as or otherwise support a means for measuring the one or more reference signals resulting in one or more measurements, where transmitting the random access request message is based on the one or more measurements of the one or more reference signals.

In some aspects, the random access procedure is a CFRA procedure. In some aspects, the UE threshold component 765 may be configured as or otherwise support a means for comparing the one or more measurements to a first threshold, where transmitting the random access request message is based on the comparison. In some aspects, the comparison is indicative that the one or more measurements is greater than the first threshold.

In some aspects, the UE threshold component 765 may be configured as or otherwise support a means for comparing the one or more measurements to a second threshold, where the second threshold is greater than the first threshold, and where the satisfaction of the one or more conditions includes the one or more measurements of the one or more reference signals being between the first threshold and the second threshold. In some aspects, the first threshold is greater than a third threshold.

In some aspects, the first threshold corresponds to a first type of the random access procedure. In some aspects, the first type of the random access procedure includes a CFRA procedure with a coverage enhancement, the second threshold corresponds to a second type of the random access procedure. In some aspects, the second type of the random access procedure includes a CFRA procedure without the coverage enhancement, and the third threshold corresponds a third type of the random access procedure. In some aspects, the third type of the random access procedure includes a CBRA procedure.

In some aspects, the UE threshold component 765 may be configured as or otherwise support a means for receiving at least one of an indication of the first threshold, an indication of the second threshold, or an indication of the third threshold. In some aspects, the one or more measurements include at least an RSRP value.

In some aspects, the UE threshold component 765 may be configured as or otherwise support a means for comparing the one or more measurements to a set of multiple thresholds resulting in a first determination or a second determination, where including the first preamble in the random access request message is based on the first determination, and where including a second preamble in the random access request message is based on the second determination.

In some aspects, the UE threshold component 765 may be configured as or otherwise support a means for comparing the one or more measurements to a set of multiple thresholds resulting in a first determination or a second determination, where transmitting the random access request message using a first random access occasion is based on the first determination, and where transmitting the random access request message using a second random access occasion is based on the second determination.

In some aspects, the UE threshold component 765 may be configured as or otherwise support a means for determining that the one or more measurements of the one or more reference signals are within a first range of values associated with CFRA transmissions with a coverage enhancement, where satisfaction of the one or more conditions includes the one or more measurement of the one or more reference signals being within the first range of values associated with the CFRA transmissions with coverage enhancement. In some aspects, a second range of values greater than the first range of values is associated with CFRA transmissions without the coverage enhancement.

In some aspects, a second range of values less than the first range of values is associated with CBRA transmissions with the coverage enhancement, and a third range of values greater than the second range of values and less than the first range of values is associated with CBRA transmissions without the coverage enhancement.

In some aspects, the first message includes an indication of a second preamble different from the first preamble. In some aspects, the first preamble is associated with repetition based transmission of the second message. In some aspects, the second preamble is associated with transmission of the second message without repetition.

In some aspects, the transmission of the random access request message is indicative of the request by the first network node for repetition based transmission of the second message based on the random access request message including the first preamble.

In some aspects, the UE preamble component 770 may be configured as or otherwise support a means for including the first preamble in the random access request message to indicate the request for resources for repetition based transmission of the second message.

In some aspects, the UE RA occasion component 760 may be configured as or otherwise support a means for receiving an indication of a first set of random access occasions and a second set of random access occasions for transmission of the random access request message, where the first set of random access occasions is associated with repetition based transmission of the second message, and where the second set of random access occasions is associated with transmission of the second message without repetition.

In some aspects, to support transmitting the random access request message, the RAR message transmitter 730 may be configured as or otherwise support a means for transmitting the random access request message over resources associated with the first set of random access occasions to indicate the request for the resources for repetition based transmission of the second message. In some aspects, the first message includes a downlink message and the second message includes an uplink message.

In some aspects, the measurement report transmitter 745 may be configured as or otherwise support a means for transmitting a measurement report that is indicative of a quality of link between the first network node and a second network node, where the first preamble is allocated based on the measurement report.

In some aspects, the UE repetition manager 750 may be configured as or otherwise support a means for receiving an indication for the first network node to transmit the second message with repetition, where satisfaction of the one or more conditions includes reception of the indication for the first network node to transmit the second message with repetition.

In some aspects, the random access response message may further include the indication for the first network node to transmit the second message with repetition.

In some aspects, the random access response message includes information indicative of the indication for the first network node to transmit the second message with repetition in a bit field for a C-RNTI.

In some aspects, to support receiving the indication for the first network node to transmit the second message with repetition, the UE repetition manager 750 may be configured as or otherwise support a means for receiving, from the second network node, an RRC message that is indicative of a configuration for the random access procedure, the configuration including the indication for the first network node to transmit the second message with repetition.

In some aspects, to support transmitting the measurement report, the measurement report transmitter 745 may be configured as or otherwise support a means for transmitting the measurement report to a third network node different from the second network node.

In some aspects, the RAR message transmitter 730 may be configured as or otherwise support a means for transmitting, as part of the random access procedure and to the second network node, a random access request message including the preamble, where the preamble is indicative that the random access procedure is a CFRA procedure instead of a CBRA procedure.

Figure 8:
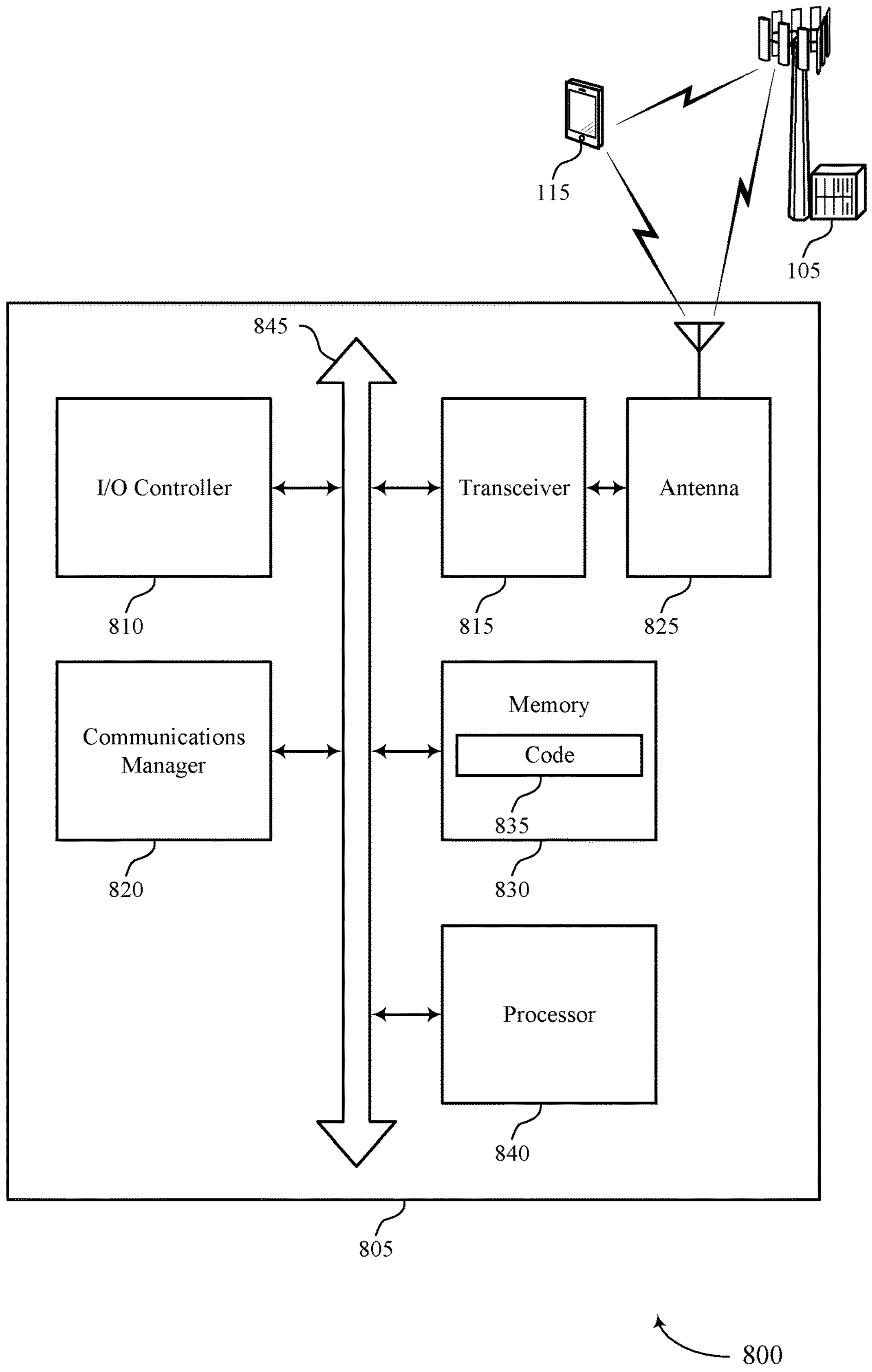
FIG. 8 shows a diagram of a system including a device that supports coverage enhancement for CFRA in accordance with one or more aspects of the present disclosure.

FIG. 8 shows a diagram of a system 800 including a device 805 that supports coverage enhancement for CFRA in accordance with one or more aspects of the present disclosure. The device 805 may be an aspect of or include the components of a device 505, a device 605, or a UE 115 (or a network node) as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an aspect of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting coverage enhancement for CFRA). For example, the device 805 or a component of the device 805 may include a processor 840 and memory 830 coupled with or to the processor 840, the processor 840 and memory 830 configured to perform various functions described herein.

The communications manager 820 may support wireless communication at a first network node in accordance with aspects as disclosed herein. For example, the communications manager 820 may be configured as or otherwise support a means for receiving a first message that indicates a first preamble allocated to the first network node for a random access procedure. The communications manager 820 may be configured as or otherwise support a means for transmitting, as part of the random access procedure, a random access request message including the first preamble. The communications manager 820 may be configured as or otherwise support a means for receiving, as part of the random access procedure and responsive to the random access request message, a random access response message including a resource grant for a second message, where the random access response message is decoded based on satisfaction of one or more conditions associated with repetition based transmission of the second message. The communications manager 820 may be configured as or otherwise support a means for transmitting, as part of the random access procedure, the second message with repetition in accordance with the resource grant.

By including or configuring the communications manager 820 in accordance with aspects as described herein, the device 805 may support techniques for improved communication reliability, reduced latency, more efficient utilization of communication resources, and improved coordination between devices.

In some aspects, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some aspects, one or more functions described with reference to the communications manager 820 may be supported by or performed by the processor 840, the memory 830, the code

835, or any combination thereof. For example, the code 835 may include instructions executable by the processor 840 to cause the device 805 to perform various aspects of coverage enhancement for CFRA as described herein, or the processor 840 and the memory 830 may be otherwise configured to perform or support such operations.

Figure 9:
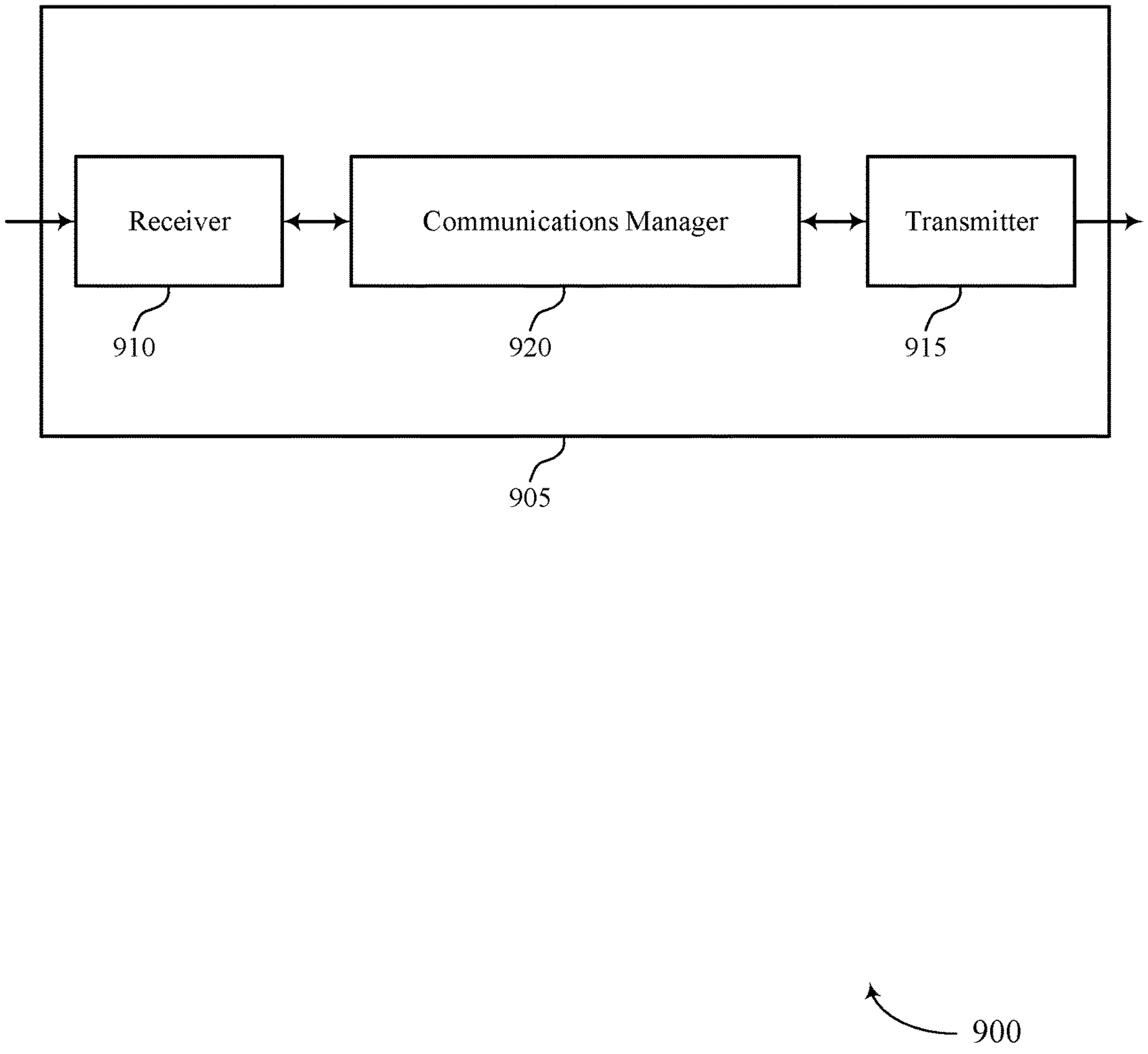
FIGS. 9 and 10 show block diagrams of devices that support coverage enhancement for CFRA in accordance with one or more aspects of the present disclosure.

FIG. 9 shows a block diagram 900 of a device 905 that supports coverage enhancement for CFRA in accordance with one or more aspects of the present disclosure. The device 905 may be an example of aspects of a network entity 105 (or a network node) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to coverage enhancement for CFRA). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to coverage enhancement for CFRA). In some aspects, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of coverage enhancement for CFRA as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network node in accordance with aspects as disclosed herein. For example, the communications manager 920 may be configured as or otherwise support a means for transmitting a first message that indicates a first preamble that is allocated to a second network node for a random access procedure. The communications manager 920 may be configured as or otherwise support a means for receiving, as part of the random access procedure, a random access request message including the first preamble. The communications manager 920 may be configured as or otherwise support a means for transmitting, as part on the random access procedure and responsive to the random access request message, a random access response message including a resource grant for a second message, where an interpretation of the random access response message is based on satisfaction of one or more conditions associated with repetition based transmission of the second message. The communications manager 920 may be configured as or otherwise support a means for receiving, as part of the random access procedure, the second message with repetition in accordance with the resource grant.

By including or configuring the communications manager 920 in accordance with aspects as described herein, the device 905 (e.g., a processor controlling or otherwise coupled with the receiver 910, the transmitter 915, the communications manager 920, or a combination thereof) may support techniques for more efficient utilization of communication resources.

Figure 10:
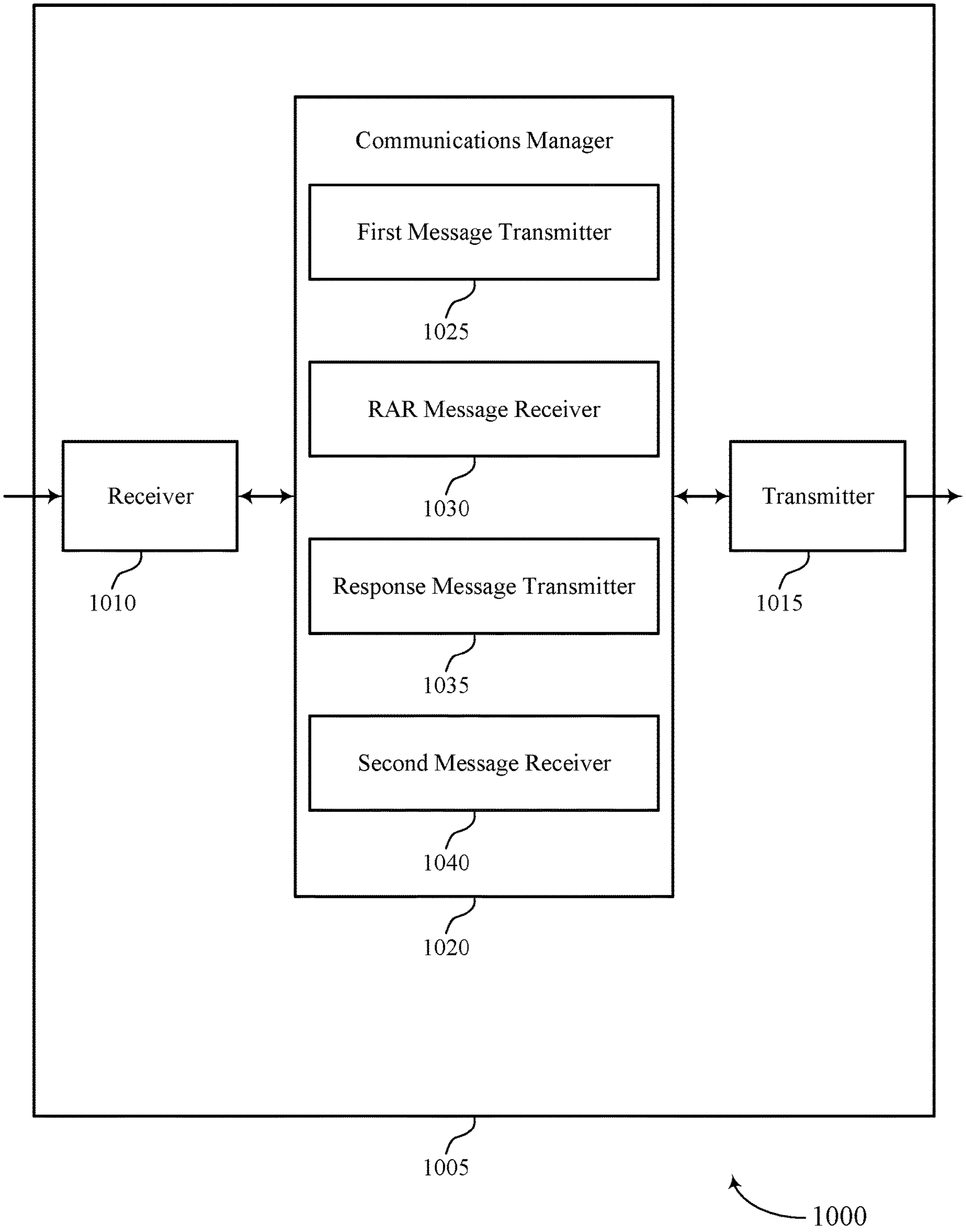

FIG. 10 shows a block diagram 1000 of a device 1005 that supports coverage enhancement for CFRA in accordance with one or more aspects of the present disclosure. The device 1005 may be an example of aspects of a device 905 or a network entity 105 (or a network node) as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to coverage enhancement for CFRA). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to coverage enhancement for CFRA). In some aspects, the transmitter 1015 may be co-located with a receiver 1010 in a transceiver module. The transmitter 1015 may utilize a single antenna or a set of multiple antennas.

The device 1005, or various components thereof, may be an example of means for performing various aspects of coverage enhancement for CFRA as described herein. For example, the communications manager 1020 may include a first message transmitter 1025, a RAR message receiver 1030, a response message transmitter 1035, a second message receiver 1040, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first network node in accordance with aspects as disclosed herein. The first message transmitter 1025 may be configured as or otherwise support a means for transmitting a first message that indicates a first preamble that is allocated to a second network node for a random access procedure. The RAR message receiver 1030 may be configured as or otherwise support a means for receiving, as part of the random access procedure, a random access request message including the first preamble. The response message transmitter 1035 may be configured as or otherwise support a means for transmitting, as part on the random access procedure and responsive to the random access request message, a random access response message including a resource grant for a second message, where an interpretation of the random access response message is based on satisfaction of one or more conditions associated with repetition based transmission of the second message. The second message receiver 1040 may be configured as or otherwise support a means for receiving, as part of the random access procedure, the second message with repetition in accordance with the resource grant.

Figure 11:
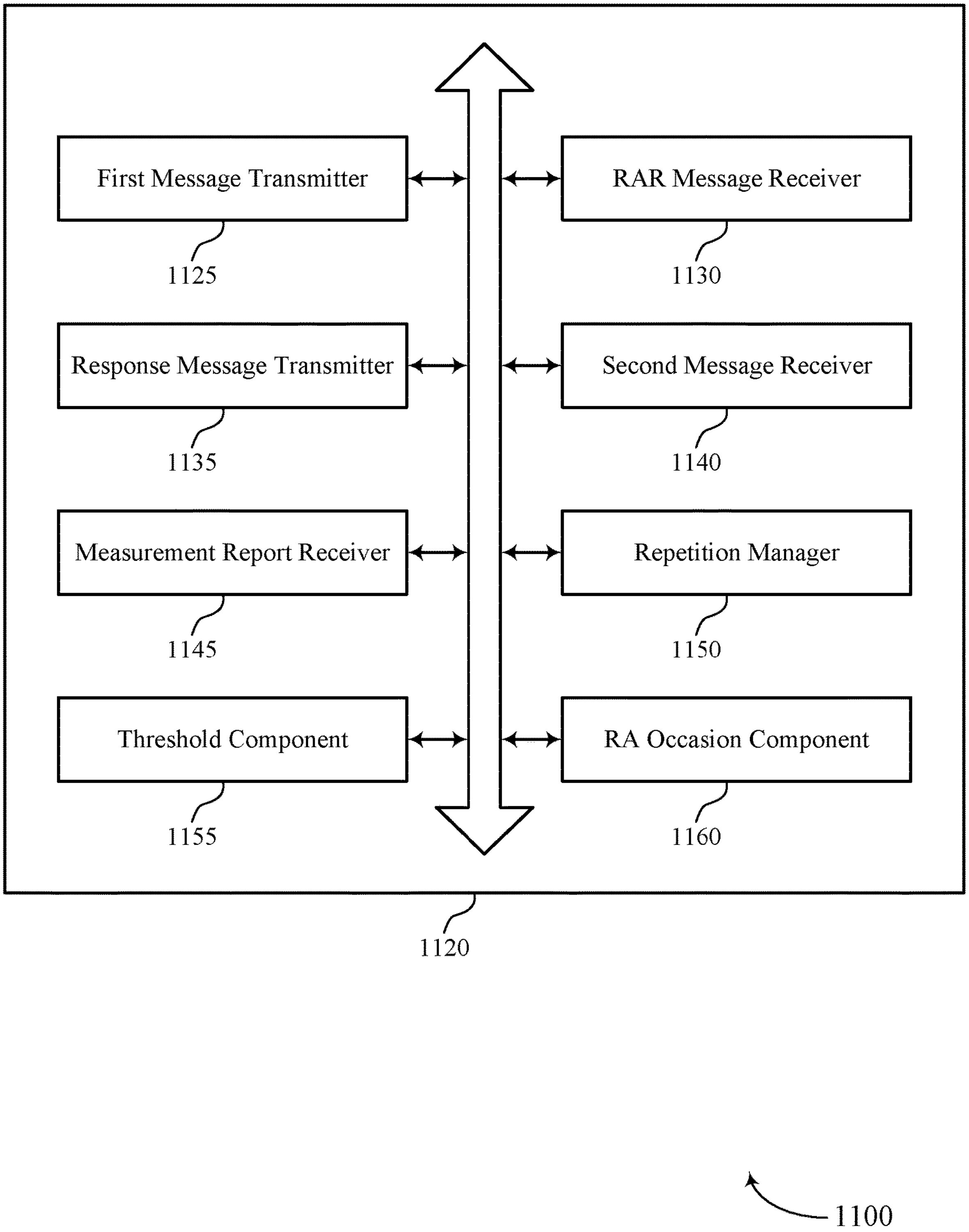
FIG. 11 shows a block diagram of a communications manager that supports coverage enhancement for CFRA in accordance with one or more aspects of the present disclosure.

FIG. 11 shows a block diagram 1100 of a communications manager 1120 that supports coverage enhancement for CFRA in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of coverage enhancement for CFRA as described herein. For example, the communications manager 1120 may include a first message transmitter 1125, a RAR message receiver 1130, a response message transmitter 1135, a second message receiver 1140, a measurement report receiver 1145, a repetition manager 1150, a threshold component 1155, a RA occasion component 1160, or any combination thereof. Each of these components may communicate, directly or indirectly, with one another (e.g., via one or more buses).

The communications manager 1120 may support wireless communication at a first network node in accordance with aspects as disclosed herein. The first message transmitter 1125 may be configured as or otherwise support a means for transmitting a first message that indicates a first preamble that is allocated to a second network node for a random access procedure. The RAR message receiver 1130 may be configured as or otherwise support a means for receiving, as part of the random access procedure, a random access request message including the first preamble. The response message transmitter 1135 may be configured as or otherwise support a means for transmitting, as part on the random access procedure and responsive to the random access request message, a random access response message including a resource grant for the second message, where an interpretation of the random access response message is based on satisfaction of one or more conditions associated with repetition based transmission of the second message. The second message receiver 1140 may be configured as or otherwise support a means for receiving, as part of the random access procedure, the second message with repetition in accordance with the resource grant.

In some aspects, reception of the random access request message is indicative of a request by the second network node to perform the repetition based transmission of the second message.

In some aspects, the random access procedure is a CFRA procedure. In some aspects, the threshold component 1155 may be configured as or otherwise support a means for transmitting at least one of an indication of a first threshold, an indication of a second threshold, or an indication of a third threshold, where the first threshold is less than the second threshold and the second threshold is less than the third threshold, and where the random access request message being indicative of the request by the second network node for repetition based transmission of the second message is based on at least one of the first threshold, the second threshold, or the third threshold.

In some aspects, the first threshold corresponds to a first type of the random access procedure. In some aspects, the first type of the random access procedure includes a CFRA procedure with a coverage enhancement, the second threshold corresponds to a second type of the random access procedure. In some aspects, the second type of the random access procedure includes a CFRA procedure without the coverage enhancement, and the third threshold corresponds a third type of the random access procedure. In some aspects, the third type of the random access procedure includes a CBRA procedure.

In some aspects, the first message includes an indication of a second preamble different from the first preamble. In some aspects, the first preamble is associated with repetition based transmission of the second message. In some aspects, the second preamble is associated with transmission of the second message without repetition.

In some aspects, the reception of the random access request message is indicative of the request by the second network node for repetition based transmission of the second message based on the random access request message including the first preamble.

In some aspects, the RA occasion component 1160 may be configured as or otherwise support a means for transmitting an indication of a first set of random access occasions and a second set of random access occasions for transmission of the random access request message, where the first set of random access occasions is associated with repetition based transmission of the second message, and where the second set of random access occasions is associated with transmission of the second message without repetition.

In some aspects, to support receiving the random access request message, the RAR message receiver 1130 may be configured as or otherwise support a means for receiving the random access request message during the first set of random access occasions. In some aspects, to support receiving the random access request message, the RAR message receiver 1130 may be configured as or otherwise support a means for determining that the random access request message is indicative of the request by the second network node for repetition based transmission of the second message based on the random access request message being received during the first set of random access occasions. In some aspects, the first message includes a downlink message and the second message includes an uplink message.

In some aspects, the measurement report receiver 1145 may be configured as or otherwise support a means for receiving a measurement report that is indicative of a quality of a link between the first network node and a second network node. In some aspects, the repetition manager 1150 may be configured as or otherwise support a means for transmitting an indication for the second network node to transmit a second message with repetition based on the measurement report, where satisfaction of the one or more conditions includes transmission of the indication for the second network node to transmit the second message with repetition.

In some aspects, the random access response message includes the indication for the second network node to transmit the second message with repetition.

In some aspects, the random access response message includes information indicative of the indication for the second network node to transmit the second message with repetition in a bit field for a C-RNTI.

In some aspects, to support transmitting the indication for the second network node to transmit the second message with the repetition, the repetition manager 1150 may be configured as or otherwise support a means for transmitting, to the second network node, an RRC message that is indicative of a configuration for the random access procedure, the configuration including the indication for the second network node to transmit the second message with repetition.

In some aspects, to support receiving the measurement report, the measurement report receiver 1145 may be configured as or otherwise support a means for receiving the measurement report from a third network node different from the second network node.

In some aspects, the preamble is indicative that the random access procedure is a CFRA procedure instead of a CBRA procedure.

Figure 12:
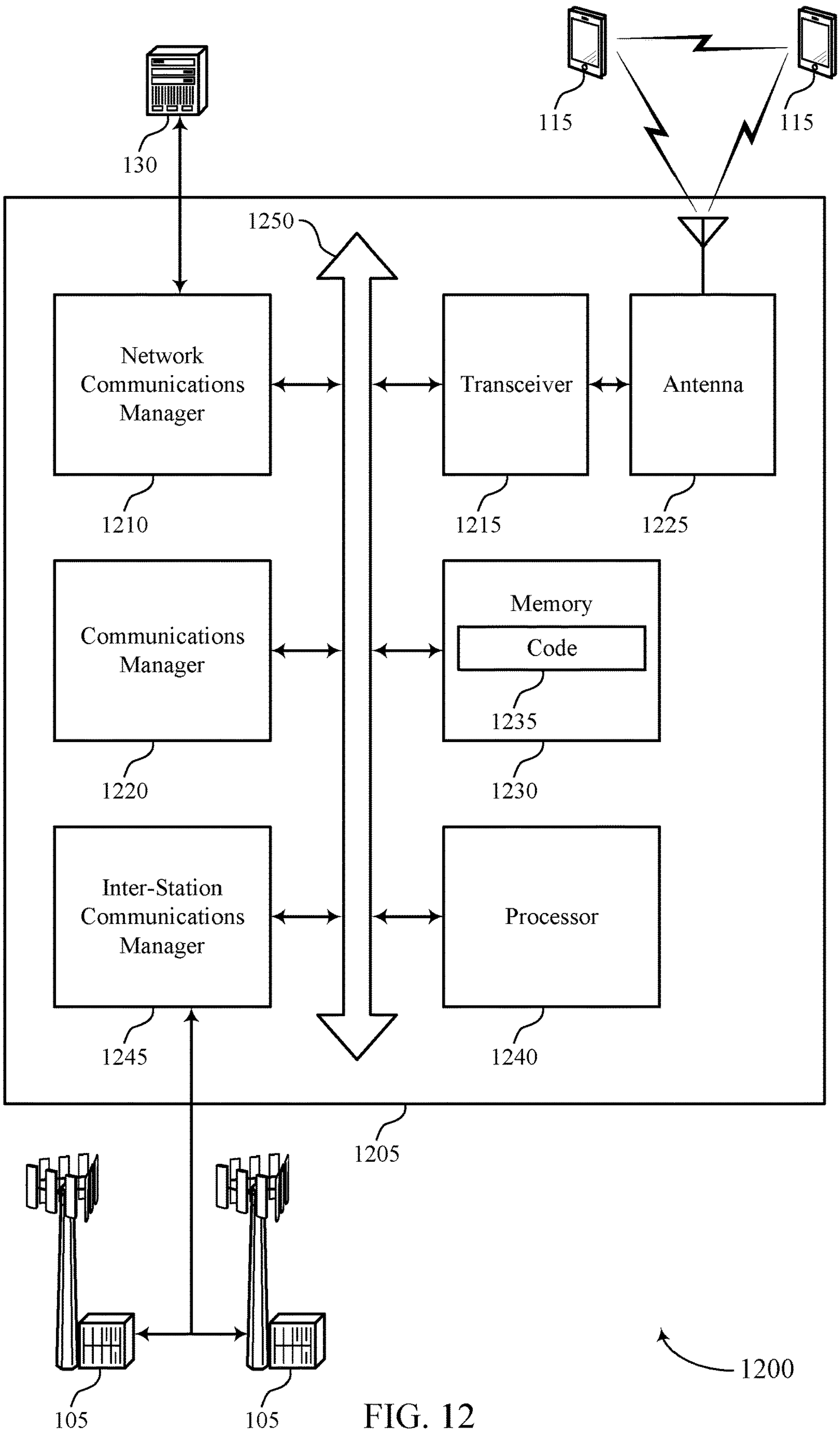
FIG. 12 shows a diagram of a system including a device that supports coverage enhancement for CFRA in accordance with one or more aspects of the present disclosure.

FIG. 12 shows a diagram of a system 1200 including a device 1205 that supports coverage enhancement for CFRA in accordance with one or more aspects of the present disclosure. The device 1205 may be an aspect of or include the components of a device 905, a device 1005, or a network entity 105 (or a network node) as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an aspect of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting coverage enhancement for CFRA). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other network entities 105, and may include a controller or scheduler for controlling communications with UEs 115 in cooperation with other network entities 105. For example, the inter-station communications manager 1245 may coordinate scheduling for transmissions to UEs 115 for various interference mitigation techniques such as beamforming or joint transmission. In some aspects, the inter-station communications manager 1245 may provide an X2 interface within an LTE/LTE-A wireless communications network technology to provide communication between network entities 105.

The communications manager 1220 may support wireless communication at a first network node in accordance with aspects as disclosed herein. For example, the communications manager 1220 may be configured as or otherwise support a means for transmitting a first message that indicates a first preamble that is allocated to a second network node for a random access procedure. The communications manager 1220 may be configured as or otherwise support a means for receiving, as part of the random access procedure, a random access request message including the first preamble. The communications manager 1220 may be configured as or otherwise support a means for transmitting, as part on the random access procedure and responsive to the random access request message, a random access response message including a resource grant for the second message, where an interpretation of the random access response message is based on satisfaction of one or more conditions associated with repetition based on transmission of the second message. The communications manager 1220 may be configured as or otherwise support a means for receiving, as part of the random access procedure, the second message with repetition in accordance with the resource grant.

By including or configuring the communications manager 1220 in accordance with aspects as described herein, the device 1205 may support techniques for improved communication reliability, reduced latency, more efficient utilization of communication resources, and improved coordination between devices.

In some aspects, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some aspects, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of coverage enhancement for CFRA as described herein, or the processor 1240 and the memory 1230 may be otherwise configured to perform or support such operations.

Figure 13:
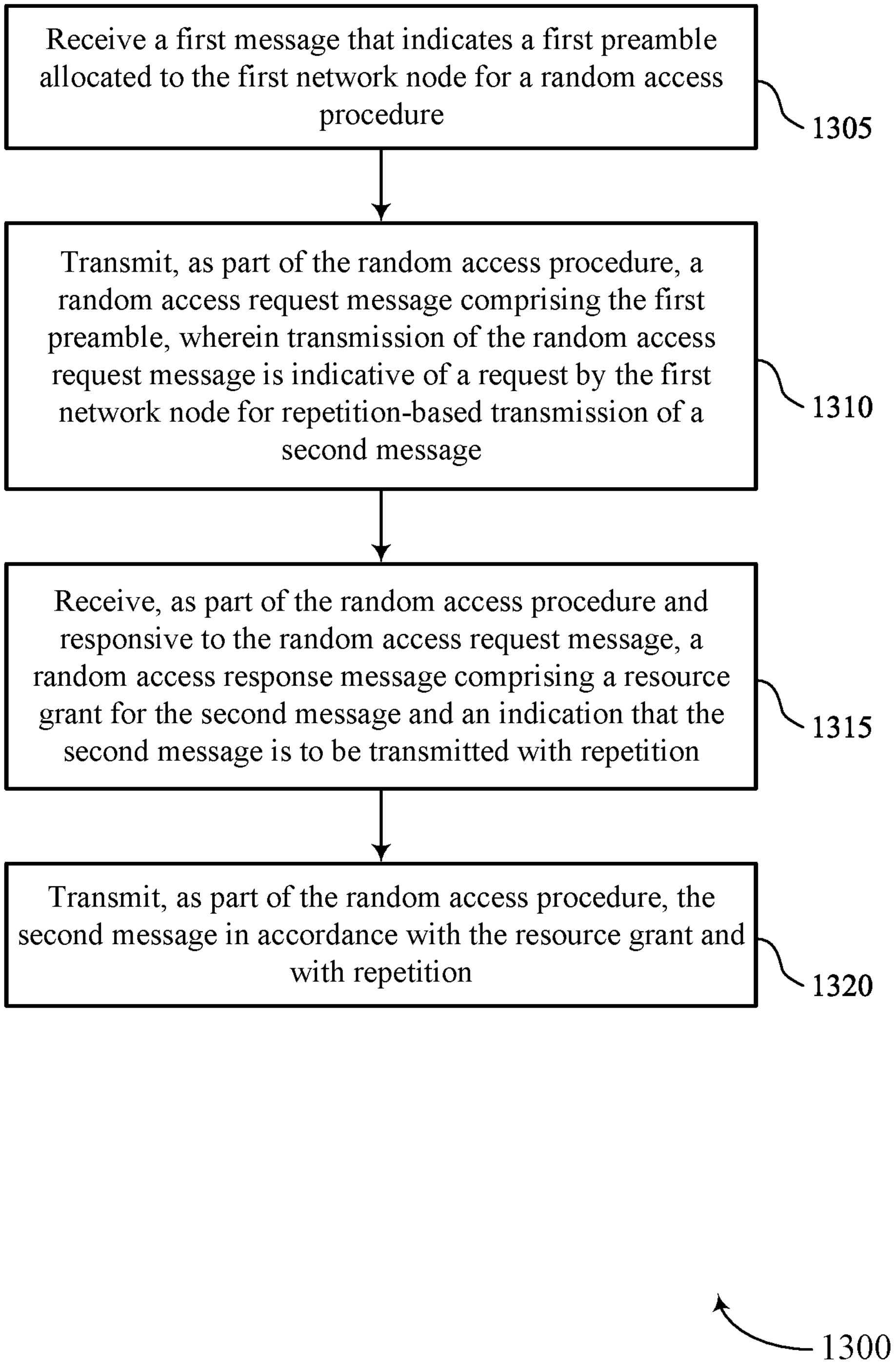
FIGS. 13 through 19 show flowcharts illustrating methods that support coverage enhancement for CFRA in accordance with one or more aspects of the present disclosure.

FIG. 13 shows a flowchart illustrating a method 1300 that supports coverage enhancement for CFRA in accordance with one or more aspects of the present disclosure. The operations of the method 1300 may be implemented by a UE (or a network node) or its components as described herein. For example, the operations of the method 1300 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1305, the method may include receiving a first message that indicates a first preamble allocated to the first network node for a random access procedure. The operations of 1305 may be performed in accordance with aspects as disclosed herein. In some aspects, aspects of the operations of 1305 may be performed by a first message receiver 725 as described with reference to FIG. 7.

At 1310, the method may include transmitting, as part of the random access procedure, a random access request message including the first preamble, where transmission of the random access request message is indicative of a request by the first network node for repetition based transmission of a second message. The operations of 1310 may be performed in accordance with aspects as disclosed herein. In some aspects, aspects of the operations of 1310 may be performed by a RAR message transmitter 730 as described with reference to FIG. 7.

At 1315, the method may include receiving, as part of the random access procedure and responsive to the random access request message, a random access response message including a resource grant for the second message and an indication that the second message is to be transmitted with repetition. The operations of 1315 may be performed in accordance with aspects as disclosed herein. In some aspects, aspects of the operations of 1315 may be performed by a response message receiver 735 as described with reference to FIG. 7.

At 1320, the method may include transmitting, as part of the random access procedure, the second message in accordance with the resource grant and with repetition. The operations of 1320 may be performed in accordance with aspects as disclosed herein. In some aspects, aspects of the operations of 1320 may be performed by a second message transmitter 740 as described with reference to FIG. 7.

Figure 14:
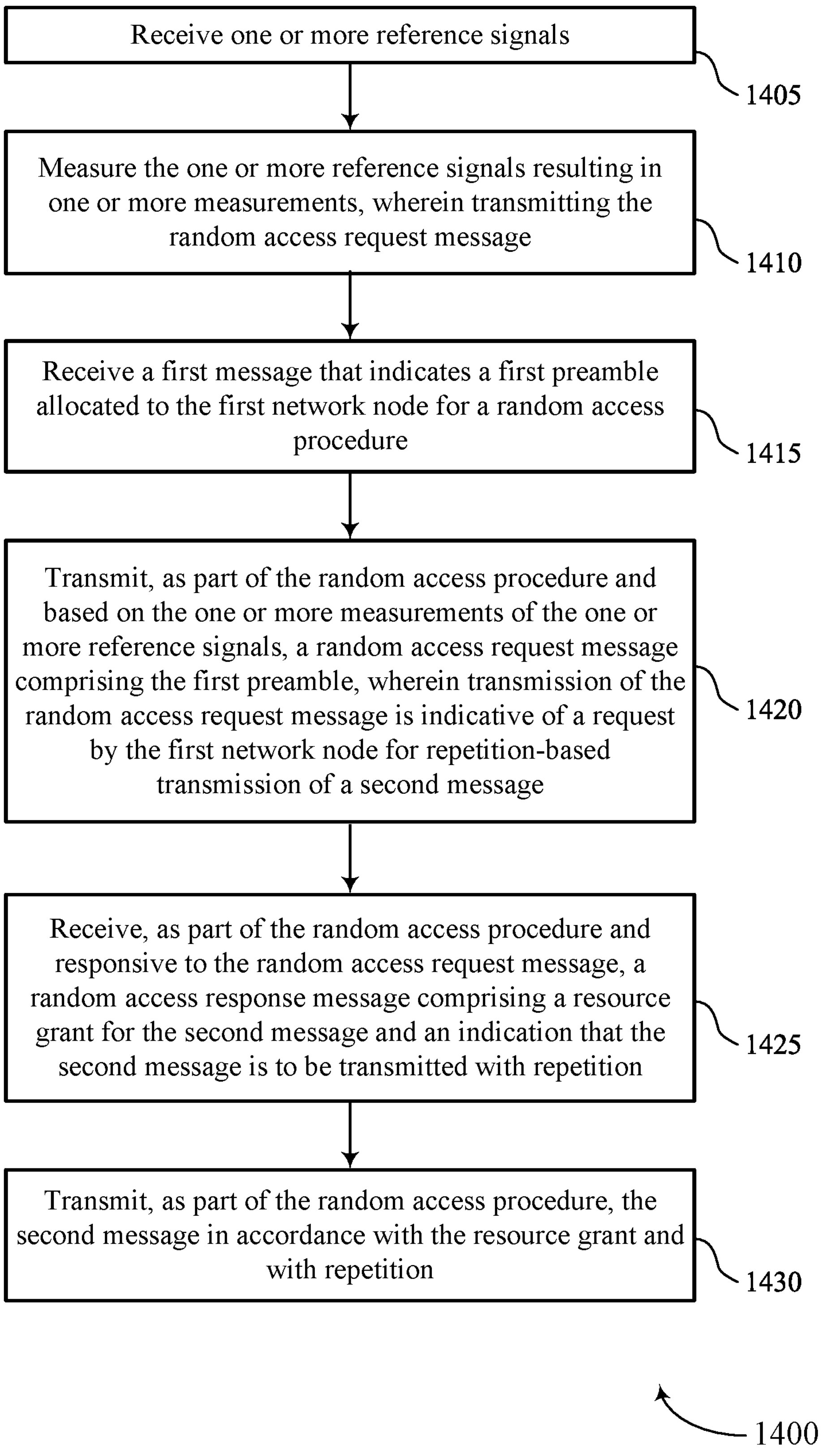

FIG. 14 shows a flowchart illustrating a method 1400 that supports coverage enhancement for CFRA in accordance with one or more aspects of the present disclosure. The operations of the method 1400 may be implemented by a UE (or a network node) or its components as described herein. For example, the operations of the method 1400 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1405, the method may include receiving one or more reference signals. The operations of 1405 may be performed in accordance with aspects as disclosed herein. In some aspects, aspects of the operations of 1405 may be performed by a UE reference signal component 755 as described with reference to FIG. 7.

At 1410, the method may include measuring the one or more reference signals resulting in one or more measurements. The operations of 1410 may be performed in accordance with aspects as disclosed herein. In some aspects, aspects of the operations of 1410 may be performed by a UE reference signal component 755 as described with reference to FIG. 7.

At 1415, the method may include receiving a first message that indicates a first preamble allocated to the first network node for a random access procedure. The operations of 1415 may be performed in accordance with aspects as disclosed herein. In some aspects, aspects of the operations of 1415 may be performed by a first message receiver 725 as described with reference to FIG. 7.

At 1420, the method may include transmitting, as part of the random access procedure and based on the one or more measurements of the one or more reference signals, a random access request message including the first preamble, where transmission of the random access request message is indicative of a request by the first network node for repetition based transmission of a second message. The operations of 1420 may be performed in accordance with aspects as disclosed herein. In some aspects, aspects of the operations of 1420 may be performed by a RAR message transmitter 730 as described with reference to FIG. 7.

At 1425, the method may include receiving, as part of the random access procedure and responsive to the random access request message, a random access response message including a resource grant for the second message and an indication that the second message is to be transmitted with repetition. The operations of 1425 may be performed in accordance with aspects as disclosed herein. In some aspects, aspects of the operations of 1425 may be performed by a response message receiver 735 as described with reference to FIG. 7.

At 1430, the method may include transmitting, as part of the random access procedure, the second message in accordance with the resource grant and with repetition. The operations of 1430 may be performed in accordance with aspects as disclosed herein. In some aspects, aspects of the operations of 1430 may be performed by a second message transmitter 740 as described with reference to FIG. 7.

Figure 15:
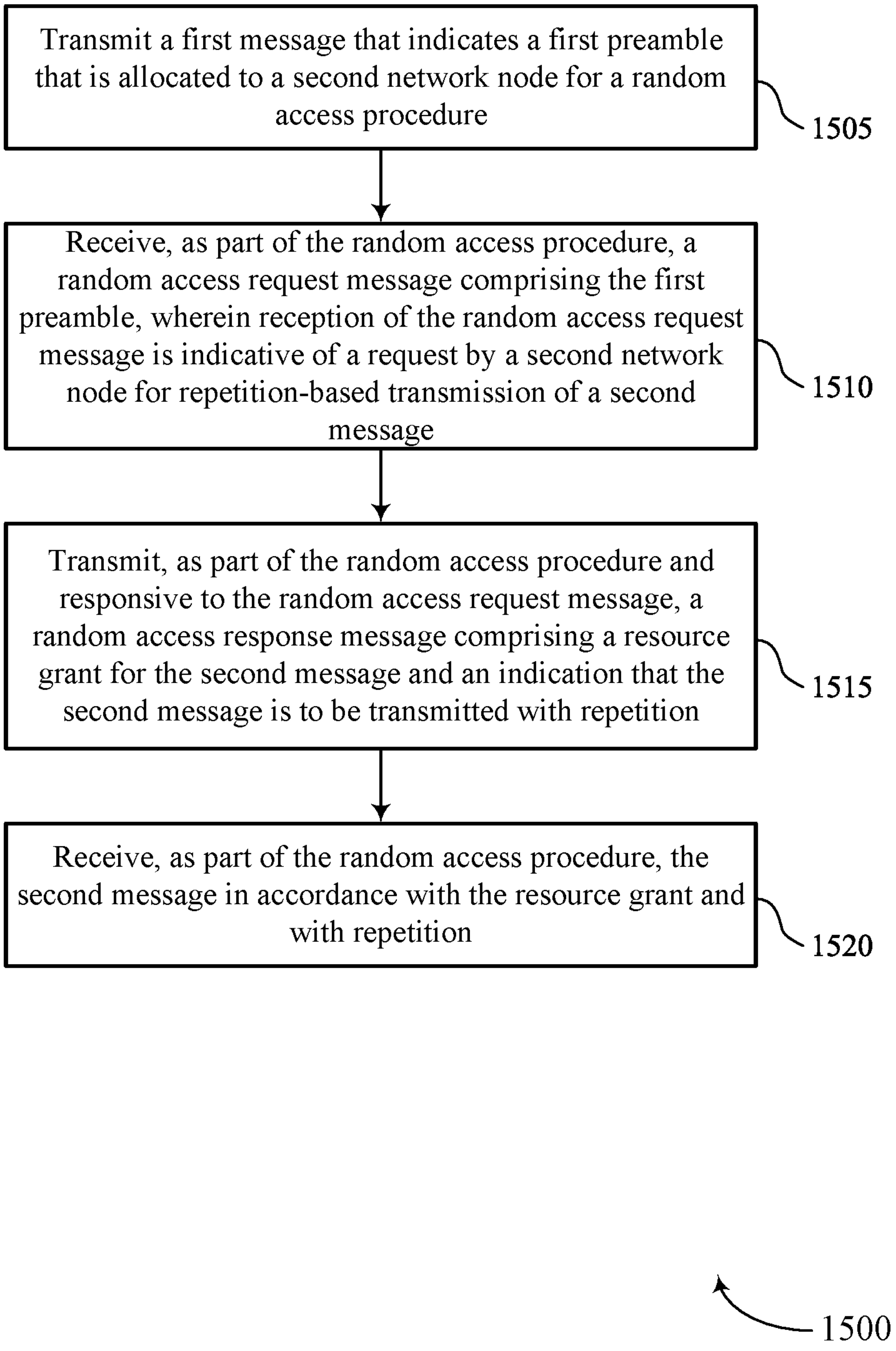

FIG. 15 shows a flowchart illustrating a method 1500 that supports coverage enhancement for CFRA in accordance with one or more aspects of the present disclosure. The operations of the method 1500 may be implemented by a network entity (or a network node) or its components as described herein. For example, the operations of the method 1500 may be performed by a network entity 105 as described with reference to FIGS. 1 through 4 and 9 through 12. In some aspects, a network entity may execute a set of instructions to control the functional elements of the network entity to perform the described functions. Additionally, or alternatively, the network entity may perform aspects of the described functions using special-purpose hardware.

At 1505, the method may include transmitting a first message that indicates a first preamble that is allocated to a second network node for a random access procedure. The operations of 1505 may be performed in accordance with aspects as disclosed herein. In some aspects, aspects of the operations of 1505 may be performed by a first message transmitter 1125 as described with reference to FIG. 11.

At 1510, the method may include receiving, as part of the random access procedure, a random access request message including the first preamble, where reception of the random access request message is indicative of a request by the second network node for repetition based transmission of a second message. The operations of 1510 may be performed in accordance with aspects as disclosed herein. In some aspects, aspects of the operations of 1510 may be performed by a RAR message receiver 1130 as described with reference to FIG. 11.

At 1515, the method may include transmitting, as part on the random access procedure and responsive to the random access request message, a random access response message including a resource grant for the second message and an indication that the second message is to be transmitted with repetition. The operations of 1515 may be performed in accordance with aspects as disclosed herein. In some aspects, aspects of the operations of 1515 may be performed by a response message transmitter 1135 as described with reference to FIG. 11.

At 1520, the method may include receiving, as part of the random access procedure, the second message in accordance with the resource grant and with repetition. The operations of 1520 may be performed in accordance with aspects as disclosed herein. In some aspects, aspects of the operations of 1520 may be performed by a second message receiver 1140 as described with reference to FIG. 11.

Figure 16:
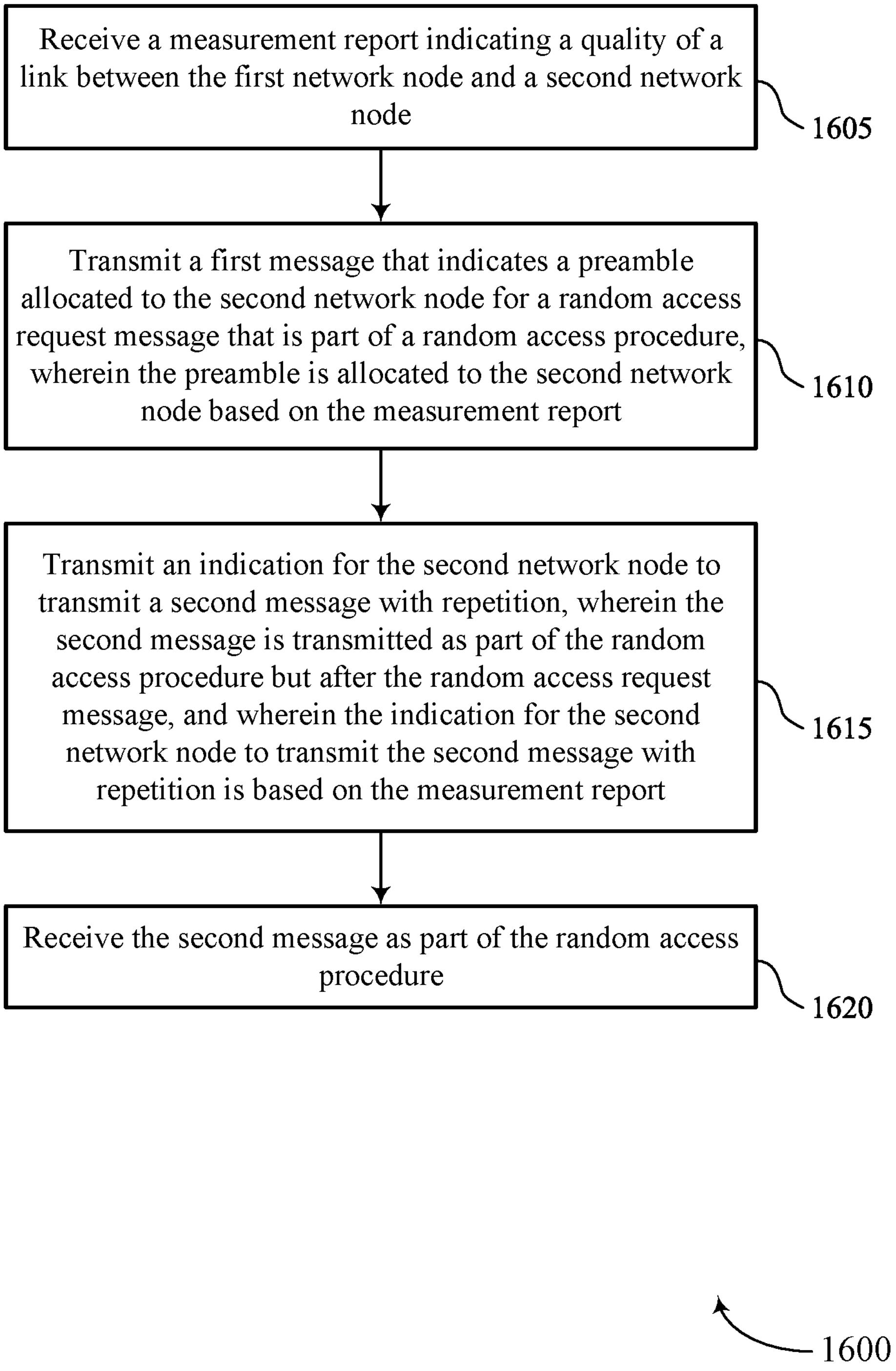

FIG. 16 shows a flowchart illustrating a method 1600 that supports coverage enhancement for CFRA in accordance with one or more aspects of the present disclosure. The operations of the method 1600 may be implemented by a network entity (or a network node) or its components as described herein. For example, the operations of the method 1600 may be performed by a network entity 105 as described with reference to FIGS. 1 through 4 and 9 through 12. In some aspects, a network entity may execute a set of instructions to control the functional elements of the network entity to perform the described functions. Additionally, or alternatively, the network entity may perform aspects of the described functions using special-purpose hardware.

At 1605, the method may include receiving a measurement report indicating a quality of a link between the first network node and a second network node. The operations of 1605 may be performed in accordance with aspects as disclosed herein. In some aspects, aspects of the operations of 1605 may be performed by a measurement report receiver 1145 as described with reference to FIG. 11.

At 1610, the method may include transmitting a first message that indicates a preamble allocated to the second network node for a random access request message that is part of a random access procedure, where the preamble is allocated to the second network node based on the measurement report. The operations of 1610 may be performed in accordance with aspects as disclosed herein. In some aspects, aspects of the operations of 1610 may be performed by a first message transmitter 1125 as described with reference to FIG. 11.

At 1615, the method may include transmitting an indication for the second network node to transmit a second message with repetition, where the second message is transmitted as part of the random access procedure but after the random access request message, and where the indication for the second network node to transmit the second message with repetition is based on the measurement report. The operations of 1615 may be performed in accordance with aspects as disclosed herein. In some aspects, aspects of the operations of 1615 may be performed by a repetition manager 1150 as described with reference to FIG. 11.

At 1620, the method may include receive the second message as part of the random access procedure. The operations of 1620 may be performed in accordance with aspects as disclosed herein. In some aspects, aspects of the operations of 1620 may be performed by a second message receiver 1140 as described with reference to FIG. 11.

Figure 17:
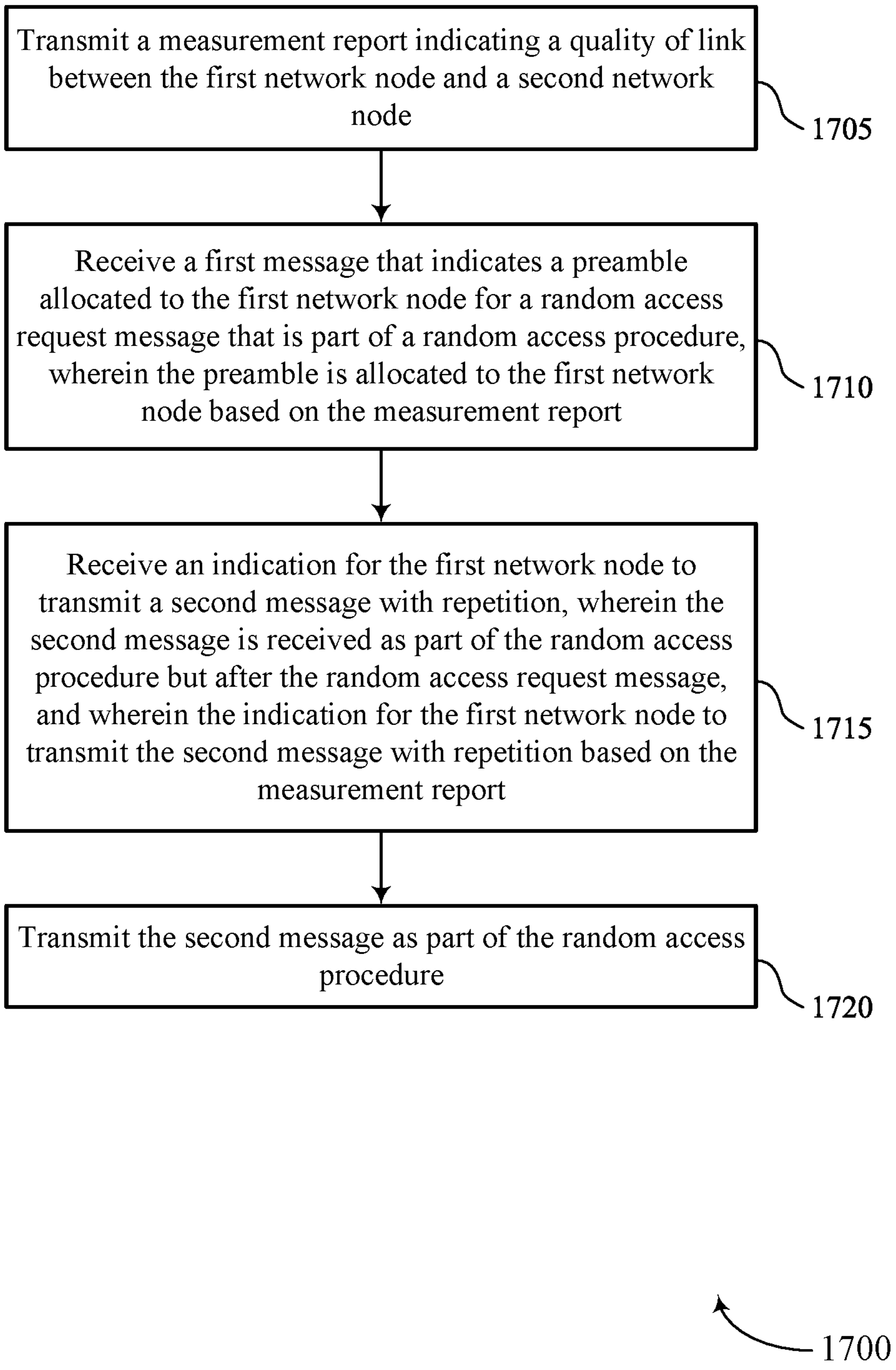

FIG. 17 shows a flowchart illustrating a method 1700 that supports coverage enhancement for CFRA in accordance with one or more aspects of the present disclosure. The operations of the method 1700 may be implemented by a UE (or a network node) or its components as described herein. For example, the operations of the method 1700 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1705, the method may include transmitting a measurement report indicating a quality of link between the first network node and a second network node. The operations of 1705 may be performed in accordance with aspects as disclosed herein. In some aspects, aspects of the operations of 1705 may be performed by a measurement report transmitter 745 as described with reference to FIG. 7.

At 1710, the method may include receiving a first message that indicates a preamble allocated to the first network node for a random access request message that is part of a random access procedure, where the preamble is allocated to the first network node based on the measurement report. The operations of 1710 may be performed in accordance with aspects as disclosed herein. In some aspects, aspects of the operations of 1710 may be performed by a first message receiver 725 as described with reference to FIG. 7.

At 1715, the method may include receiving an indication for the first network node to transmit a second message with repetition, where the second message is received as part of the random access procedure but after the random access request message, and where the indication for the first network node to transmit the second message with repetition based on the measurement report. The operations of 1715 may be performed in accordance with aspects as disclosed herein. In some aspects, aspects of the operations of 1715 may be performed by a UE repetition manager 750 as described with reference to FIG. 7.

At 1720, the method may include transmitting the second message as part of the random access procedure. The operations of 1720 may be performed in accordance with aspects as disclosed herein. In some aspects, aspects of the operations of 1720 may be performed by a second message transmitter 740 as described with reference to FIG. 7.

Figure 18:
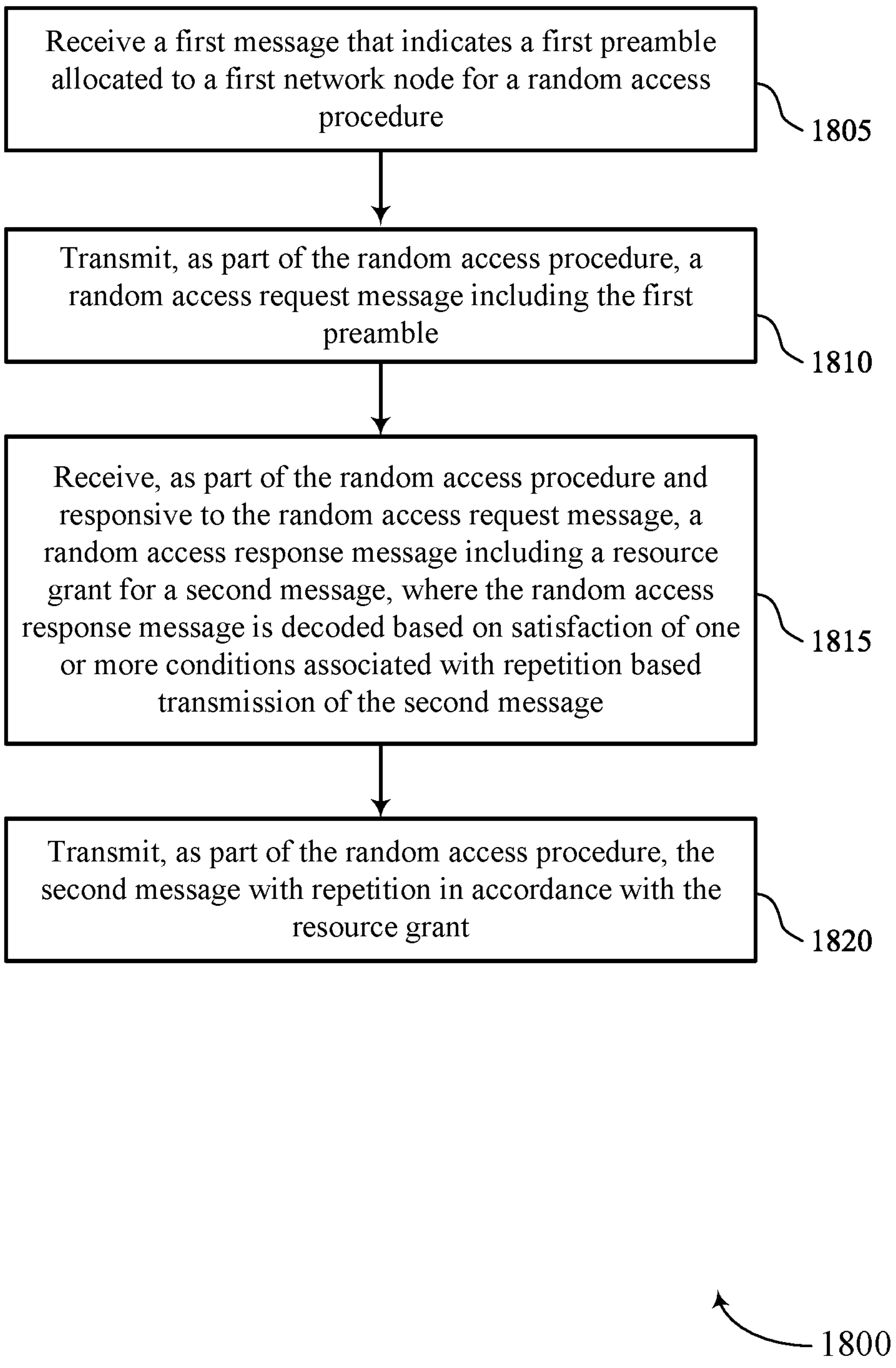

FIG. 18 illustrates a flowchart showing a method 1800 that supports coverage enhancement for CFRA in accordance with one or more aspects of the present disclosure. The operations of the method 1800 may be implemented by a UE (or a network node) or its components as described herein. For example, the operations of the method 1800 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1805, the method may include receiving a first message that indicates a first preamble allocated to a first network node for a random access procedure. The operations of 1805 may be performed in accordance with aspects as disclosed herein. In some aspects, aspects of the operations of 1805 may be performed by a first message receiver 725 as described with reference to FIG. 7.

At 1810, the method may include transmitting, as part of the random access procedure, a random access request message including the first preamble. The operations of 1810 may be performed in accordance with aspects as disclosed herein. In some aspects, aspects of the operations of 1810 may be performed by a RAR message transmitter 730 as described with reference to FIG. 7.

At 1815, the method may include receiving, as part of the random access procedure and responsive to the random access request message, a random access response message including a resource grant for a second message, where the random access response message is decoded based on satisfaction of one or more conditions associated with repetition based transmission of the second message. The operations of 1815 may be performed in accordance with aspects as disclosed herein. In some aspects, aspects of the operations of 1815 may be performed by a response message receiver 735 as described with reference to FIG. 7.

At 1820, the method may include transmitting, as part of the random access procedure, the second message with repetition in accordance with the resource grant. The operations of 1820 may be performed in accordance with aspects as disclosed herein. In some aspects, aspects of the operations of 1820 may be performed by a second message transmitter 740 as described with reference to FIG. 7.

Figure 19:
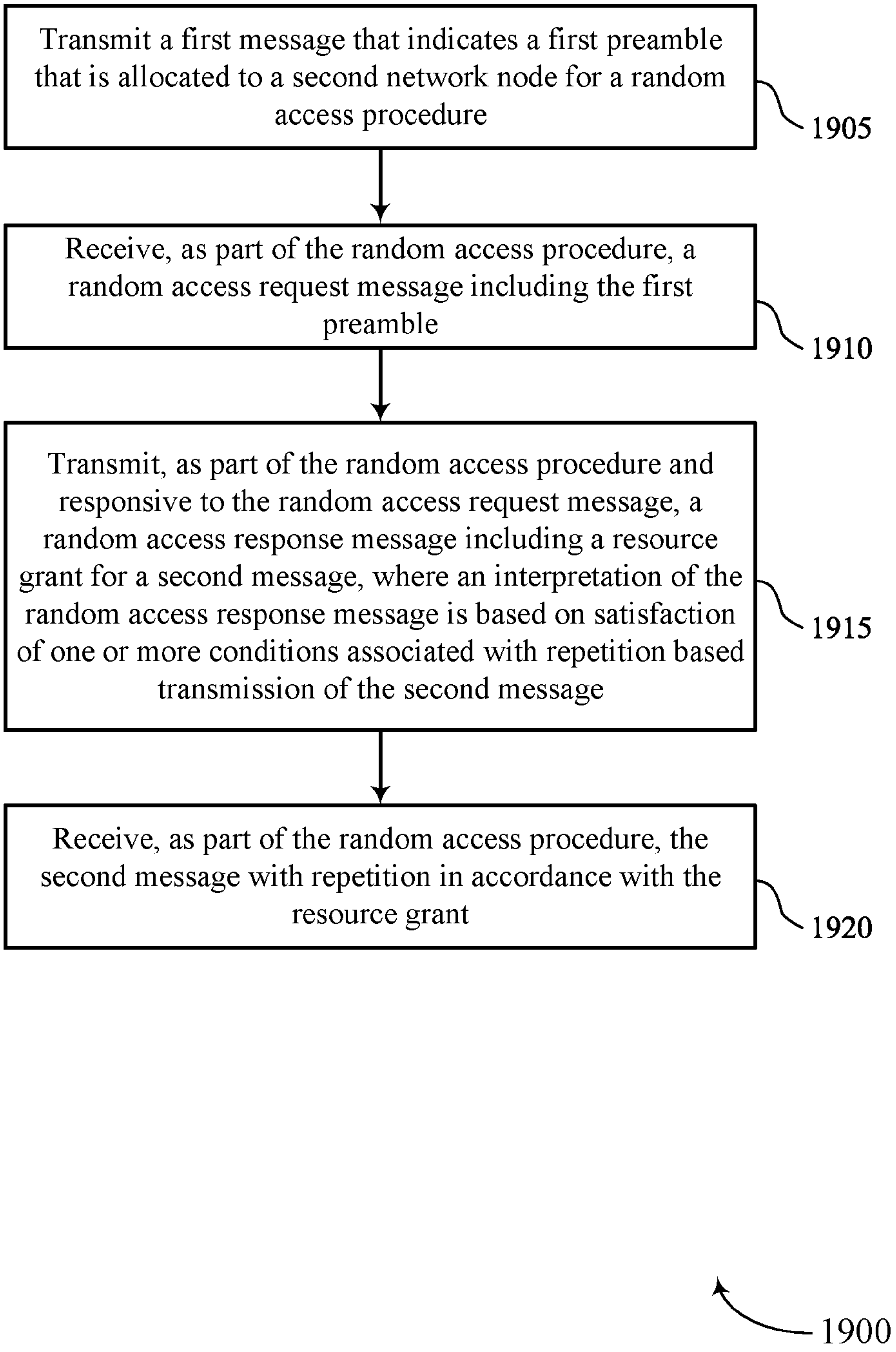

FIG. 19 illustrates a flowchart showing a method 1900 that supports coverage enhancement for CFRA in accordance with one or more aspects of the present disclosure. The operations of the method 1900 may be implemented by a network entity (or a network node) or its components as described herein. For example, the operations of the method 1900 may be performed by a network entity 105 as described with reference to FIGS. 1 through 4 and 9 through 12. In some aspects, a network entity may execute a set of instructions to control the functional elements of the network entity to perform the described functions. Additionally, or alternatively, the network entity may perform aspects of the described functions using special-purpose hardware.

At 1905, the method may include transmitting a first message that indicates a first preamble that is allocated to a second network node for a random access procedure. The operations of 1905 may be performed in accordance with aspects as disclosed herein. In some aspects, aspects of the operations of 1905 may be performed by a first message transmitter 1125 as described with reference to FIG. 11.

At 1910, the method may include receiving, as part of the random access procedure, a random access request message including the first preamble. The operations of 1910 may be performed in accordance with aspects as disclosed herein. In some aspects, aspects of the operations of 1910 may be performed by a RAR message receiver 1130 as described with reference to FIG. 11.

At 1915, the method may include transmitting, as part on the random access procedure and responsive to the random access request message, a random access response message including a resource grant for a second message, where an interpretation of the random access response message is based on satisfaction of one or more conditions associated with repetition based transmission of the second message. The operations of 1915 may be performed in accordance with aspects as disclosed herein. In some aspects, aspects of the operations of 1915 may be performed by a response message transmitter 1135 as described with reference to FIG. 11.

At 1920, the method may include receiving, as part of the random access procedure, the second message with repetition in accordance with the resource grant. The operations of 1920 may be performed in accordance with aspects as disclosed herein. In some aspects, aspects of the operations of 1920 may be performed by a second message receiver 1140 as described with reference to FIG. 11.

The following provides an overview of aspects of the present disclosure:

Aspect 1: A method for wireless communication at a first network node, comprising: receiving a first message that indicates a first preamble allocated to the first network node for a random access procedure; transmitting, as part of the random access procedure, a random access request message comprising the first preamble, wherein transmission of the random access request message is indicative of a request by the first network node for repetition based transmission of a second message; receiving, as part of the random access procedure and responsive to the random access request message, a random access response message comprising a resource grant for the second message and an indication that the second message is to be transmitted with repetition; and transmitting, as part of the random access procedure, the second message in accordance with the resource grant and with repetition.

Aspect 2: The method of aspect 1, further comprising: receiving one or more reference signals; and measuring the one or more reference signals resulting in one or more measurements, wherein transmitting the random access request message is based on the one or more measurements of the one or more reference signals.

Aspect 3: The method of aspect 2, wherein the random access procedure is a CFRA procedure.

Aspect 4: The method of any of aspects 2 and 3, further comprising: comparing the one or more measurements to a first threshold, wherein transmitting the random access request message is based on the comparison.

Aspect 5: The method of aspect 4, wherein the comparison is indicative that the one or more measurements is greater than the first threshold.

Aspect 6: The method of any of aspects 4 and 5, further comprising: comparing the one or more measurements to a second threshold, wherein the second threshold is greater than the first threshold, and wherein transmitting the random access request message is based on the one or more measurements of the one or more reference signals being between the first threshold and the second threshold.

Aspect 7: The method of aspect 6, wherein the first threshold is greater than a third threshold.

Aspect 8: The method of aspect 7, wherein the first threshold corresponds to a first type of the random access procedure, the first type of the random access procedure comprises a CFRA procedure with a coverage enhancement, the second threshold corresponds to a second type of the random access procedure, the second type of the random access procedure comprises a CFRA procedure without the coverage enhancement, and the third threshold corresponds a third type of the random access procedure the third type of the random access procedure comprises a CBRA procedure.

Aspect 9: The method of any of aspects 7 and 8, further comprising: receiving at least one of an indication of the first threshold, an indication of the second threshold, or an indication of the third threshold.

Aspect 10: The method of any of aspects 2 through 9, wherein the one or more measurements comprise at least a RSRP value.

Aspect 11: The method of any of aspects 2 through 10, further comprising: comparing the one or more measurements to a plurality of thresholds resulting in a first determination or a second determination, wherein including the first preamble in the random access request message is based on the first determination, and wherein including a second preamble in the random access request message is based on the second determination.

Aspect 12: The method of any of aspects 2 through 11, further comprising: comparing the one or more measurements to a plurality of thresholds resulting in a first determination or a second determination, wherein transmitting the random access request message using a first random access occasion is based on the first determination, and wherein transmitting the random access request message using a second random access occasion is based on the second determination.

Aspect 13: The method of any of aspects 2 through 12, further comprising: determining that the one or more measurements of the one or more reference signals are within a first range of values associated with CFRA transmissions with a coverage enhancement.

Aspect 14: The method of aspect 13, wherein a second range of values greater than the first range of values is associated with CFRA transmissions without the coverage enhancement.

Aspect 15: The method of any of aspects 13 and 14, wherein a second range of values less than the first range of values is associated with CBRA transmissions with the coverage enhancement, and a third range of values greater than the second range of values and less than the first range of values is associated with CBRA transmissions without the coverage enhancement.

Aspect 16: The method of any of aspects 1 through 15, wherein the first message includes an indication of a second preamble different from the first preamble, the first preamble is associated with repetition based transmission of the second message, and the second preamble is associated with transmission of the second message without repetition.

Aspect 17: The method of aspect 16, wherein the transmission of the random access request message is indicative of the request by the first network node for repetition based transmission of the second message based on the random access request message comprising the first preamble.

Aspect 18: The method of any of aspects 16 and 17, further comprising: including the first preamble in the random access request message to indicate the request for resources for repetition based transmission of the second message.

Aspect 19: The method of any of aspects 1 through 18, further comprising: receiving an indication of a first set of random access occasions and a second set of random access occasions for transmission of the random access request message, wherein the first set of random access occasions is associated with repetition based transmission of the second message, and wherein the second set of random access occasions is associated with transmission of the second message without repetition.

Aspect 20: The method of aspect 19, wherein transmitting the random access request message comprises: transmitting the random access request message over resources associated with the first set of random access occasions to indicate the request for the resources for repetition based transmission of the second message.

Aspect 21: The method of any of aspects 1 through 20, wherein the first message comprises a downlink message and the second message comprises an uplink message.

Aspect 22: A method for wireless communication at a first network node, comprising: transmitting a first message that indicates a first preamble that is allocated to a second network node for a random access procedure; receiving, as part of the random access procedure, a random access request message comprising the first preamble, wherein reception of the random access request message is indicative of a request by a second network node for repetition based transmission of a second message; transmitting, as part on the random access procedure and responsive to the random access request message, a random access response message comprising a resource grant for the second message and an indication that the second message is to be transmitted with repetition; and receiving, as part of the random access procedure, the second message in accordance with the resource grant and with repetition.

Aspect 23: The method of aspect 22, wherein the random access procedure is a CFRA procedure.

Aspect 24: The method of any of aspects 22 and 23, further comprising: transmitting at least one of an indication of a first threshold, an indication of a second threshold, or an indication of a third threshold, wherein the first threshold is less than the second threshold and the second threshold is less than the third threshold, and wherein the random access request message being indicative of the request by the second network node for repetition based transmission of the second message is based on at least one of the first threshold, the second threshold, or the third threshold.

Aspect 25: The method of aspect 24, wherein the first threshold corresponds to a first type of the random access procedure, the first type of the random access procedure comprises a CFRA procedure with a coverage enhancement, the second threshold corresponds to a second type of the random access procedure, the second type of the random access procedure comprises a CFRA procedure without the coverage enhancement, and the third threshold corresponds a third type of the random access procedure, the third type of the random access procedure comprises a CBRA procedure.

Aspect 26: The method of any of aspects 22 through 25, wherein the first message includes an indication of a second preamble different from the first preamble, the first preamble is associated with repetition based transmission of the second message, and the second preamble is associated with transmission of the second message without repetition.

Aspect 27: The method of aspect 26, wherein the reception of the random access request message is indicative of the request by the second network node for repetition based transmission of the second message based on the random access request message comprising the first preamble.

Aspect 28: The method of any of aspects 22 through 27, further comprising: transmitting an indication of a first set of random access occasions and a second set of random access occasions for transmission of the random access request message, wherein the first set of random access occasions is associated with repetition based transmission of the second message, and wherein the second set of random access occasions is associated with transmission of the second message without repetition.

Aspect 29: The method of aspect 28, wherein receiving the random access request message comprises: receiving the random access request message during the first set of random access occasions; and determining that the random access request message is indicative of the request by the second network node for repetition based transmission of the second message based on the random access request message being received during the first set of random access occasions.

Aspect 30: The method of any of aspects 22 through 29, wherein the first message comprises a downlink message and the second message comprises an uplink message.

Aspect 31: A method for wireless communication at a first network node, comprising: receiving a measurement report indicating a quality of a link between the first network node and a second network node; transmitting a first message that indicates a preamble allocated to the second network node for a random access request message that is part of a random access procedure, wherein the preamble is allocated to the second network node based on the measurement report; transmitting an indication for the second network node to transmit a second message with repetition, wherein the second message is transmitted as part of the random access procedure but after the random access request message, and wherein the indication for the second network node to transmit the second message with repetition is based on the measurement report; and receive the second message as part of the random access procedure.

Aspect 32: The method of aspect 31, wherein transmitting the indication for the second network node to transmit the second message with the repetition comprises: transmitting, as part of the random access procedure and to the second network node, a random access response message comprising a resource grant for the second message and the indication for the second network node to transmit the second message with repetition.

Aspect 33: The method of aspect 32, wherein the random access response message includes information indicative of the indication for the second network node to transmit the second message with repetition in a bit field for a C-RNTI.

Aspect 34: The method of any of aspects 31 and 32, wherein transmitting the indication for the second network node to transmit the second message with the repetition comprises: transmitting, to the second network node, an RRC message indicating a configuration for the random access procedure, the configuration comprising the indication for the second network node to transmit the second message with repetition.

Aspect 35: The method of any of aspects 31 through 34, wherein receiving the measurement report comprises: receiving the measurement report from a third network node different from the second network node.

Aspect 36: The method of any of aspects 31 through 35, further comprising: receiving, as part of the random access procedure and from the second network node, a random access request message comprising the preamble, wherein the preamble is indicative that the random access procedure is a CFRA procedure instead of a CBRA procedure.

Aspect 37: The method of any of aspects 31 through 36, wherein the first message comprises a downlink message and the second message comprises an uplink message.

Aspect 38: A method for wireless communication at a first network node, comprising: transmitting a measurement report indicating a quality of link between the first network node and a second network node; receiving a first message that indicates a preamble allocated to the first network node for a random access request message that is part of a random access procedure, wherein the preamble is allocated to the first network node based on the measurement report; receiving an indication for the first network node to transmit a second message with repetition, wherein the second message is received as part of the random access procedure but after the random access request message, and wherein the indication for the first network node to transmit the second message with repetition based on the measurement report; and transmitting the second message as part of the random access procedure.

Aspect 39: The method of aspect 38, wherein receiving the indication for the first network node to transmit the second message with repetition comprises: receiving, as part of the random access procedure and from the second network node, a random access response message comprising a resource grant for the second message and the indication for the first network node to transmit the second message with repetition.

Aspect 40: The method of aspect 39, wherein the random access response message includes information indicative of the indication for the first network node to transmit the second message with repetition in a bit field for a C-RNTI.

Aspect 41: The method of any of aspects 38 and 39, wherein receiving the indication for the first network node to transmit the second message with repetition comprises: receiving, from the second network node, a RRC message indicating a configuration for the random access procedure, the configuration comprising the indication for the first network node to transmit the second message with repetition.

Aspect 42: The method of any of aspects 38 through 41, wherein transmitting the measurement report comprises: transmitting the measurement report to a third network node different from the second network node.

Aspect 43: The method of any of aspects 38 through 42, further comprising: transmitting, as part of the random access procedure and to the second network node, a random access request message comprising the preamble, wherein the preamble is indicative that the random access procedure is a CFRA procedure instead of a CBRA procedure.

Aspect 44: The method of any of aspects 38 through 43, wherein the first message comprises a downlink message and the second message comprises an uplink message.

Aspect 45: An apparatus for wireless communication at a first network node, comprising a memory and at least one processor coupled to the memory, wherein the at least one processor is configured to perform a method of any of aspects 1 through 21.

Aspect 46: An apparatus for wireless communication at a first network node, comprising at least one means for performing a method of any of aspects 1 through 21.

Aspect 47: A non-transitory computer-readable medium having code for wireless communication stored thereon that, when executed by a first network node, causes the first network node to perform a method of any of aspects 1 through 21.

Aspect 48: An apparatus for wireless communication at a first network node, comprising a memory and at least one processor coupled to the memory, wherein the at least one processor is configured to perform a method of any of aspects 22 through 30.

Aspect 49: An apparatus for wireless communication at a first network node, comprising at least one means for performing a method of any of aspects 22 through 30.

Aspect 50: A non-transitory computer-readable medium having code for wireless communication stored thereon that, when executed by a first network node, causes the first network node to perform a method of any of aspects 22 through 30.

Aspect 51: An apparatus for wireless communication at a first network node, comprising a memory and at least one processor coupled to the memory, wherein the at least one processor is configured to perform a method of any of aspects 31 through 37.

Aspect 52: An apparatus for wireless communication at a first network node, comprising at least one means for performing a method of any of aspects 31 through 37.

Aspect 53: A non-transitory computer-readable medium having code for wireless communication stored thereon that, when executed by a first network node, causes the first network node to perform a method of any of aspects 31 through 37.

Aspect 54: An apparatus for wireless communication at a first network node, comprising a memory and at least one processor coupled to the memory, wherein the at least one processor is configured to perform a method of any of aspects 38 through 44.

Aspect 55: An apparatus for wireless communication at a first network node, comprising at least one means for performing a method of any of aspects 38 through 44.

Aspect 56: A non-transitory computer-readable medium having code for wireless communication stored thereon that, when executed by a first network node, causes the first network node to perform a method of any of aspects 38 through 44.

Aspect 57: A method for wireless communications at a first network node, comprising: receiving a first message that indicates a first preamble allocated to a first network node for a random access procedure; transmitting, as part of the random access procedure, a random access request message comprising the first preamble; receiving, as part of the random access procedure and responsive to the random access request message, a random access response message comprising a resource grant for a second message, wherein the random access response message is decoded based on satisfaction of one or more conditions associated with repetition based transmission of the second message; and transmitting, as part of the random access procedure, the second message with repetition in accordance with the resource grant.

Aspect 58: The method of aspect 57, wherein transmission of the random access request message is indicative of a request by the first network node to perform the repetition based transmission of the second message.

Aspect 59: The method of aspect 58, further comprising: receiving one or more reference signals; and measuring the one or more reference signals resulting in one or more measurements, wherein transmitting the random access request message is based on the one or more measurements of the one or more reference signals.

Aspect 60: The method of aspect 59, wherein the random access procedure is a CFRA procedure.

Aspect 61: The method of any of aspects 59 and 60, further comprising: comparing the one or more measurements to a first threshold, wherein transmitting the random access request message is based on the comparison.

Aspect 62: The method of aspect 61, wherein the comparison is indicative that the one or more measurements is greater than the first threshold.

Aspect 63: The method of any of aspects 61 and 62, further comprising: comparing the one or more measurements to a second threshold, wherein the second threshold is greater than the first threshold, and wherein the satisfaction of the one or more conditions comprises the one or more measurements of the one or more reference signals being between the first threshold and the second threshold.

Aspect 64: The method of aspect 63, wherein the first threshold is greater than a third threshold.

Aspect 65: The method of aspect 64, wherein the first threshold corresponds to a first type of the random access procedure, the first type of the random access procedure comprises a CFRA procedure with a coverage enhancement, the second threshold corresponds to a second type of the random access procedure, the second type of the random access procedure comprises a CFRA procedure without the coverage enhancement, and the third threshold corresponds a third type of the random access procedure, the third type of the random access procedure comprises a contention-based random access procedure.

Aspect 66: The method of any of aspects 64 and 65, further comprising: receiving at least one of an indication of the first threshold, an indication of the second threshold, and an indication of the third threshold.

Aspect 67: The method of any of aspects 59 through 66, wherein the one or more measurements comprise at least a RSRP value.

Aspect 68: The method of any of aspects 59 through 67, further comprising: comparing the one or more measurements to a plurality of thresholds resulting in a first determination or a second determination, wherein the method further comprising including the first preamble in the random access request message based on the first determination, and including a second preamble in the random access request message based on the second determination.

Aspect 69: The method of any of aspects 59 through 68, further comprising: comparing the one or more measurements to a plurality of thresholds resulting in a first determination or a second determination, wherein the random access request message is transmitted using a first random access occasion based on the first determination, and the random access request message is transmitted using a second random access occasion based on the second determination.

Aspect 70: The method of any of aspects 59 through 69, further comprising: determining that the one or more measurements of the one or more reference signals are within a first range of values associated with CFRA transmissions with a coverage enhancement, wherein satisfaction of the one or more conditions comprises the one or more measurements of the one or more reference signals being within the first range of values associated with the CFRA transmissions with the coverage enhancement.

Aspect 71: The method of aspect 70, wherein a second range of values greater than the first range of values is associated with CFRA transmissions without the coverage enhancement.

Aspect 72: The method of any of aspects 70 and 71, wherein a second range of values less than the first range of values is associated with CBRA transmissions with the coverage enhancement, and a third range of values greater than the second range of values and less than the first range of values is associated with CBRA transmissions without the coverage enhancement.

Aspect 73: The method of any of aspects 58 through 72, wherein the first message includes an indication of a second preamble different from the first preamble, the first preamble is associated with repetition based transmission of the second message, and the second preamble is associated with transmission of the second message without repetition.

Aspect 74: The method of aspect 73, wherein the transmission of the random access request message is indicative of the request by the first network node for repetition based transmission of the second message based on the random access request message comprising the first preamble.

Aspect 75: The method of any of aspects 73 and 74, further comprising: including the first preamble in the random access request message to indicate the request for resources for repetition based transmission of the second message.

Aspect 76: The method of any of aspects 57 through 75, further comprising: receiving an indication of a first set of random access occasions and a second set of random access occasions for transmission of the random access request message, wherein the first set of random access occasions is associated with repetition based transmission of the second message, and wherein the second set of random access occasions is associated with transmission of the second message without repetition.

Aspect 77: The method of aspect 76, wherein transmitting the random access request message comprises: transmitting the random access request message over resources associated with the first set of random access occasions to indicate a request for the resources for repetition based transmission of the second message.

Aspect 78: The method of any of aspects 57 through 77, wherein the first message comprises a downlink message and the second message comprises an uplink message.

Aspect 79: The method of aspect 78, further comprising: transmitting a measurement report that is indicative of a quality of a link between the first network node and a second network node, wherein the first preamble is allocated based on the measurement report.

Aspect 80: The method of aspect 79, further comprising: receiving an indication for the first network node to transmit the second message with repetition based on the measurement report, wherein satisfaction of the one or more conditions comprises reception of the indication for the first network node to transmit the second message with repetition.

Aspect 81: The method of aspect 80, wherein the random access response message further comprises the indication for the first network node to transmit the second message with repetition.

Aspect 82: The method of aspect 81, wherein the random access response message comprises information indicative of the indication for the first network node to transmit the second message with repetition in a bit field for a C-RNTI.

Aspect 83: The method of any of aspects 80 through 82, wherein receiving the indication for the first network node to transmit the second message with repetition comprises: receiving, from the second network node, an RRC message that is indicative of a configuration for the random access procedure, the configuration comprising the indication for the first network node to transmit the second message with repetition.

Aspect 84: The method of any of aspects 79 through 83, wherein transmitting the measurement report comprises: transmit the measurement report to a third network node different from the second network node.

Aspect 85: The method of any of aspects 57 through 84, wherein the first preamble is indicative that the random access procedure is a CFRA procedure instead of a CBRA procedure.

Aspect 86: A method for wireless communications, comprising: transmitting a first message that indicates a first preamble that is allocated to a second network node for a random access procedure; receiving, as part of the random access procedure, a random access request message comprising the first preamble; transmitting, as part on the random access procedure and responsive to the random access request message, a random access response message comprising a resource grant for a second message, wherein an interpretation of the random access response message is based on satisfaction of one or more conditions associated with repetition based transmission of the second message; and receiving, as part of the random access procedure, the second message with repetition in accordance with the resource grant.

Aspect 87: The method of aspect 86, wherein reception of the random access request message is indicative of a request by the second network node to perform the repetition based transmission of the second message.

Aspect 88: The method of aspect 87, wherein the random access procedure is a CFRA procedure.

Aspect 89: The method of any of aspects 87 and 88, further comprising: transmitting at least one of an indication of a first threshold, an indication of a second threshold, and an indication of a third threshold, wherein the first threshold is less than the second threshold and the second threshold is less than the third threshold, and wherein the random access request message being indicative of the request by the second network node for repetition based transmission of the second message is based on at least one of the first threshold, the second threshold, or the third threshold.

Aspect 90: The method of aspect 89, wherein the first threshold corresponds to a first type of the random access procedure, the first type of the random access procedure comprises a CFRA procedure with a coverage enhancement, the second threshold corresponds to a second type of the random access procedure, the second type of the random access procedure comprises a CFRA procedure without the coverage enhancement, and the third threshold corresponds a third type of the random access procedure, the third type of the random access procedure comprises a CBRA procedure.

Aspect 91: The method of any of aspects 86 through 90, wherein the first message includes an indication of a second preamble different from the first preamble, the first preamble is associated with repetition based transmission of the second message, and the second preamble is associated with transmission of the second message without repetition.

Aspect 92: The method of aspect 91, wherein reception of the random access request message is indicative of a request by the second network node for repetition based transmission of the second message.

Aspect 93: The method of any of aspects 86 through 92, further comprising: transmitting an indication of a first set of random access occasions and a second set of random access occasions for transmission of the random access request message, wherein the first set of random access occasions is associated with repetition based transmission of the second message, and wherein the second set of random access occasions is associated with transmission of the second message without repetition.

Aspect 94: The method of aspect 93, wherein receiving the random access request message comprises: receiving the random access request message over resources associated with the first set of random access occasions; and determining that the random access request message is indicative of a request by the second network node for repetition based transmission of the second message based on the random access request message being received during the first set of random access occasions.

Aspect 95: The method of any of aspects 86 through 94, wherein the first message comprises a downlink message and the second message comprises an uplink message.

Aspect 96: The method of aspect 86, further comprising: receiving a measurement report that is indicative of a quality of a link between a first network node and the second network node, wherein the first preamble is allocated based on the measurement report.

Aspect 97: The method of aspect 96, further comprising: transmitting an indication for the second network node to transmit the second message with repetition based on the measurement report, wherein satisfaction of the one or more conditions comprises transmission of the indication for the second network node to transmit the second message with repetition.

Aspect 98: The method of aspect 97, wherein the random access response message further comprises the indication for the second network node to transmit the second message with repetition.

Aspect 99: The method of aspect 98, wherein the random access response message comprises information indicative of the indication for the second network node to transmit the second message with repetition in a bit field for a C-RNTI.

Aspect 100: The method of any of aspects 97 through 99, wherein transmitting the indication for the second network node to transmit the second message comprises: transmitting, to the second network node, an RRC message that is indicative of a configuration for the random access procedure, the configuration comprising the indication for the second network node to transmit the second message with repetition.

Aspect 101: The method of any of aspects 96 through 100, wherein receiving the measurement report comprises: receiving the measurement report from a third network node different from the second network node.

Aspect 102: The method of any of aspects 86 through 101, wherein the first preamble is indicative that the random access procedure is a CFRA procedure instead of a CBRA procedure.

Aspect 103: An apparatus for wireless communications at a first network node, comprising a memory and at least one processor coupled to the memory, wherein the at least one processor is configured to perform a method of any of aspects 57 through 85.

Aspect 104: An apparatus for wireless communications at a first network node, comprising at least one means for performing a method of any of aspects 57 through 85.

Aspect 105: A non-transitory computer-readable medium having code for wireless communications stored thereon that, when executed by a first network node, causes the first network node to perform a method of any of aspects 57 through 85.

Aspect 106: An apparatus for wireless communications at a first network node, comprising a memory and at least one processor coupled to the memory, wherein the at least one processor is configured to cause the apparatus to perform a method of any of aspects 86 through 102.

Aspect 107: An apparatus for wireless communications at a first network node, comprising at least one means for performing a method of any of aspects 86 through 102.

Aspect 108: A non-transitory computer-readable medium having code for wireless communications stored thereon that, when executed by a first network node causes the first network node to perform a method of any of aspects 86 through 102.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining, and the like. Also, "determining" can include receiving (such as receiving information), accessing (such as accessing data in a memory), and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the aspects that may be implemented or that are within the scope of the claims. The term "aspect" used herein means "serving as an aspect, instance, or illustration," and not "preferred" or "advantageous over other aspects." The detailed description includes specific details for the purpose of providing an understanding of the described techniques. These techniques, however, may be practiced without these specific details.

The description enables a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein but is to be accorded the broadest scope consistent with the principles and novel features disclosed herein.

What is claimed is:

1. A first network node for wireless communication, comprising:

a memory; and at least one processor coupled to the memory, wherein the at least one processor is configured to:

receive a first message that indicates a first preamble allocated to the first network node for a random access procedure;

receive an indication of a first set of random access occasions and a second set of random access occasions for transmission of a random access request message, wherein the first set of random access occasions is associated with repetition based transmission of a second message, and wherein the second set of random access occasions is associated with transmission of the second message without repetition;

transmit, as part of the random access procedure, the random access request message comprising the first preamble;

receive, as part of the random access procedure and responsive to the random access request message, a random access response message comprising a resource grant for the second message, wherein the random access response message is decoded based on satisfaction of one or more conditions associated with repetition based transmission of the second message; and transmit, as part of the random access procedure, the second message with repetition in accordance with the resource grant.

2. The first network node of claim 1, wherein transmission of the random access request message is indicative of a request by the first network node to perform the repetition based transmission of the second message.

3. The first network node of claim 2, wherein the at least one processor is further configured to:

receive one or more reference signals; and measure the one or more reference signals resulting in one or more measurements, wherein, to transmit the random access request message, the at least one processor is configured to transmit the random access request message based on the one or more measurements of the one or more reference signals.

4. The first network node of claim 3, wherein the at least one processor is further configured to:

compare the one or more measurements to a first threshold, wherein, to transmit the random access request message, the at least one processor is configured to transmit the random access request message based on the comparison.

5. The first network node of claim 4, wherein the comparison is indicative that the one or more measurements is greater than the first threshold.

6. The first network node of claim 4, wherein the at least one processor is further configured to:

compare the one or more measurements to a second threshold, wherein the second threshold is greater than the first threshold, and wherein the satisfaction of the one or more conditions comprises the one or more measurements of the one or more reference signals being between the first threshold and the second threshold.

7. The first network node of claim 6, wherein the thresholds comprise a third threshold, and wherein the first threshold is greater than a third threshold.

8. The first network node of claim 7, wherein:

the first threshold corresponds to a first type of the random access procedure, wherein the first type of the random access procedure comprises a contention-free random access procedure with a coverage enhancement;

the second threshold corresponds to a second type of the random access procedure, wherein the second type of the random access procedure comprises a contention-free random access procedure without the coverage enhancement; and the third threshold corresponds a third type of the random access procedure, wherein the third type of the random access procedure comprises a contention-based random access procedure.

9. The first network node of claim 7, wherein the at least one processor is further configured to:

receive at least one of:

an indication of the first threshold;

an indication of the second threshold; or an indication of the third threshold.

10. The first network node of claim 1, wherein the first message includes an indication of a second preamble different from the first preamble, wherein the first preamble is associated with repetition based transmission of the second message, and wherein the second preamble is associated with transmission of the second message without repetition.

11. The first network node of claim 1, wherein, to transmit the random access request message, the at least one processor is configured to:

transmit the random access request message over resources associated with the first set of random access occasions to indicate a request for the resources for repetition based transmission of the second message.

12. The first network node of claim 1, wherein the first preamble is indicative that the random access procedure is a contention-free random access procedure instead of a contention-based random access procedure.

13. A first network node for wireless communication, comprising:

a memory; and at least one processor coupled to the memory, wherein the at least one processor is configured to:

receive one or more reference signals;

measure the one or more reference signals resulting in one or more measurements, wherein, to transmit the random access request message, the at least one processor is configured to transmit the random access request message based on the one or more measurements of the one or more reference signals;

compare the one or more measurements to a plurality of thresholds resulting in a first determination or a second determination, wherein the at least one processor is configured to cause the first preamble to be included in the random access request message based on the first determination, and wherein the at least one processor is configured to cause a second preamble to be included in the random access request message based on the second determination;

receive a first message that indicates a first preamble allocated to the first network node for a random access procedure;

transmit, as part of the random access procedure, a random access request message comprising the first preamble, wherein transmission of the random access request message is indicative of a request by the first network node to perform the repetition based transmission of the second message;

receive, as part of the random access procedure and responsive to the random access request message, a random access response message comprising a resource grant for a second message, wherein the random access response message is decoded based on satisfaction of one or more conditions associated with repetition based transmission of the second message; and transmit, as part of the random access procedure, the second message with repetition in accordance with the resource grant.

14. A first network node for wireless communication, comprising:

a memory; and at least one processor coupled to the memory, wherein the at least one processor is configured to:

receive one or more reference signals;

measure the one or more reference signals resulting in one or more measurements, wherein, to transmit the random access request message, the at least one processor is configured to transmit the random access request message based on the one or more measurements of the one or more reference signals;

compare the one or more measurements to a plurality of thresholds resulting in a first determination or a second determination, wherein the at least one processor is configured to cause the random access request message to be transmitted using a first random access occasion based on the first determination, and wherein the at least one processor is configured to cause the random access request message to be transmitted using a second random access occasion based on the second determination;

receive a first message that indicates a first preamble allocated to the first network node for a random access procedure;

transmit, as part of the random access procedure, a random access request message comprising the first preamble, wherein transmission of the random access request message is indicative of a request by the first network node to perform the repetition based transmission of the second message;

receive, as part of the random access procedure and responsive to the random access request message, a random access response message comprising a resource grant for a second message, wherein the random access response message is decoded based on satisfaction of one or more conditions associated with repetition based transmission of the second message; and transmit, as part of the random access procedure, the second message with repetition in accordance with the resource grant.

15. A first network node for wireless communication, comprising:

a memory; and at least one processor coupled to the memory, wherein the at least one processor is configured to:

receive one or more reference signals;

measure the one or more reference signals resulting in one or more measurements, wherein, to transmit the random access request message, the at least one processor is configured to transmit the random access request message based on the one or more measurements of the one or more reference signals;

determine that the one or more measurements of the one or more reference signals are within a first range of values associated with contention-free random access transmissions with a coverage enhancement, wherein satisfaction of the one or more conditions comprises the one or more measurements of the one or more reference signals being within the first range of values associated with the contention-free random access transmissions with the coverage enhancement;

receive a first message that indicates a first preamble allocated to the first network node for a random access procedure;

transmit, as part of the random access procedure, a random access request message comprising the first preamble, wherein transmission of the random access request message is indicative of a request by the first network node to perform the repetition based transmission of the second message;

receive, as part of the random access procedure and responsive to the random access request message, a random access response message comprising a resource grant for a second message, wherein the random access response message is decoded based on satisfaction of one or more conditions associated with repetition based transmission of the second message; and transmit, as part of the random access procedure, the second message with repetition in accordance with the resource grant.

16. The first network node of claim 15, wherein a second range of values greater than the first range of values is associated with contention-free random access transmissions without the coverage enhancement.

17. The first network node of claim 15, wherein a second range of values less than the first range of values is associated with contention-based random access transmissions with the coverage enhancement, and a third range of values greater than the second range of values and less than the first range of values is associated with contention-based random access transmissions without the coverage enhancement.

18. A first network node for wireless communication, comprising:

a memory; and at least one processor coupled to the memory, wherein the at least one processor is configured to:

receive a first message that indicates a first preamble allocated to the first network node for a random access procedure;

transmit, as part of the random access procedure, a random access request message comprising the first preamble;

receive, as part of the random access procedure and responsive to the random access request message, a random access response message comprising a resource grant for a second message, wherein the random access response message is decoded based on satisfaction of one or more conditions associated with repetition based transmission of the second message;

transmit, as part of the random access procedure, the second message with repetition in accordance with the resource grant;

transmit a measurement report that is indicative of a quality of a link between the first network node and a second network node, wherein the first preamble is allocated based on the measurement report; and receive an indication for the first network node to transmit the second message with repetition based on the measurement report, wherein satisfaction of the one or more conditions comprises reception of the indication for the first network node to transmit the second message with repetition.

19. The first network node of claim 18, wherein the random access response message further comprises the indication for the first network node to transmit the second message with repetition.

20. The first network node of claim 19, wherein the random access response message comprises information indicative of the indication for the first network node to transmit the second message with repetition in a bit field for a cell radio network temporary identifier.

21. The first network node of claim 20, wherein, to receive the indication for the first network node to transmit the second message with repetition, the at least one processor is configured to:

receive, from the second network node, a radio resource control message that is indicative of a configuration for the random access procedure, the configuration comprising the indication for the first network node to transmit the second message with repetition.

22. A first network node for wireless communication, comprising:

a memory; and at least one processor coupled to the memory, wherein the at least one processor is configured to:

transmit a first message that indicates a first preamble that is allocated to a second network node for a random access procedure;

receive, as part of the random access procedure, a random access request message comprising the first preamble;

transmit, as part on the random access procedure and responsive to the random access request message, a random access response message comprising a resource grant for a second message, wherein an interpretation of the random access response message is based on satisfaction of one or more conditions associated with repetition based transmission of the second message; and receive a measurement report that is indicative of a quality of a link between the first network node and the second network node, wherein the first preamble is allocated based on the measurement report;

transmit an indication for the second network node to transmit the second message with repetition based on the measurement report, wherein satisfaction of the one or more conditions comprises transmission of the indication for the second network node to transmit the second message with repetition; and receive, as part of the random access procedure, the second message with repetition in accordance with the resource grant.

23. The first network node of claim 22, wherein reception of the random access request message is indicative of a request by the second network node to perform the repetition based transmission of the second message.

* * * * *